United States Patent
Leadens, II et al.

(10) Patent No.: US 9,856,695 B2
(45) Date of Patent: Jan. 2, 2018

(54) SYSTEM AND METHOD FOR INTEGRATED MAGNETIC SLIDER ASSEMBLY FOR HANGING PARTITION

(71) Applicant: The Boeing Company, Chicago, IL (US)

(72) Inventors: Todd J. Leadens, II, Lake Stevens, WA (US); Jing (Kelly) Zhang, Lynnwood, WA (US); Ada Mbata, Lynnwood, WA (US); Will J. Roach, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 15 days.

(21) Appl. No.: 14/825,168

(22) Filed: Aug. 12, 2015

(65) Prior Publication Data

US 2016/0115721 A1    Apr. 28, 2016

Related U.S. Application Data

(60) Provisional application No. 62/068,759, filed on Oct. 26, 2014.

(51) Int. Cl.
```
B64C 1/14        (2006.01)
E06B 9/36        (2006.01)
B64D 11/00       (2006.01)
```

(52) U.S. Cl.
CPC .......... *E06B 9/362* (2013.01); *B64D 11/0023* (2013.01)

(58) Field of Classification Search
CPC ..... B64D 11/0023; B64D 11/00; B64D 11/04; B64D 2011/0076; B64D 33/0612;
(Continued)

(56) References Cited

U.S. PATENT DOCUMENTS

| 3,144,274 A | 8/1964 | Harris |
| 3,399,713 A * | 9/1968 | Wilson .................. A47H 13/14 160/348 |

(Continued)

FOREIGN PATENT DOCUMENTS

| CN | 201326339 Y | 10/2009 |
| DE | 20316312 U1 | 12/2003 |

(Continued)

OTHER PUBLICATIONS

Krautli, Florian, "Magnetic Curtain" web pages, Jan. 31, 2008, printed on Aug. 21, 2010, from Internet website at web address <http://www.kraeutli.com/index.php/2008/01/31/magnetic-curtain/>, 4 pages.

(Continued)

*Primary Examiner* — Assres H Woldemaryam

(57) ABSTRACT

There is provided a system for an integrated magnetic slider assembly. The system has the integrated magnetic slider assembly with a slider portion, a hanger portion coupled to or integrated with the slider portion, and one or more magnets coupled to the hanger portion. The system further has a longitudinal hanging device configured for coupling to and suspending the slider portion of the integrated magnetic slider assembly. The system further has at least one hanging partition configured for coupling to the hanger portion of the integrated magnetic slider assembly, the at least one hanging partition having a plurality of pleats. All the magnets in a plurality of integrated magnetic slider assemblies are vertically aligned with respect to each other to cause a magnetic attraction between adjacent magnets in order to hold the plurality of pleats together, when the at least one hanging partition is in a retracted position.

20 Claims, 25 Drawing Sheets

(58) Field of Classification Search
CPC ............ A47K 3/38; A47K 3/302; A47K 3/02; B60N 2/34; E06B 9/362
See application file for complete search history.

(56) References Cited

U.S. PATENT DOCUMENTS

| | | | |
|---|---|---|---|
| 5,524,689 A | 6/1996 | Clark | |
| 5,609,197 A * | 3/1997 | Liao | A47H 1/04 160/330 |
| 6,394,168 B1 * | 5/2002 | Zoboski | A47H 13/00 160/123 |
| 8,540,006 B1 * | 9/2013 | Vestal | E06B 9/38 160/340 |
| 2001/0039677 A1 * | 11/2001 | Bryce | A47K 3/38 4/609 |
| 2005/0109468 A1 | 5/2005 | Hsu | |
| 2006/0185072 A1 * | 8/2006 | Dyckow | A47K 3/38 4/609 |
| 2008/0295283 A1 | 12/2008 | Tice | |
| 2009/0242147 A1 * | 10/2009 | Breuer | B60R 11/00 160/323.1 |
| 2009/0242149 A1 | 10/2009 | Breuer et al. | |
| 2012/0043028 A1 * | 2/2012 | Roach | B64D 11/0023 160/84.06 |
| 2015/0053817 A1 * | 2/2015 | Wartena | B64D 11/00 244/118.6 |

FOREIGN PATENT DOCUMENTS

| | | |
|---|---|---|
| JP | 411225877 A | 8/1999 |
| JP | 200064745 A | 2/2000 |
| JP | 2004353139 A | 12/2004 |

OTHER PUBLICATIONS

Tatum, Malcolm, "What are Magnetic Curtains?" web pages, copyright 2003-2010, printed on Aug. 21, 2010, from Internet website at web address <http://www.wisegeek.com/what-are-magnetic-curtains.htm>, 2 pages.

Electronic Code of Federal Regulations, Title 14: Aeronautics and Space, Section 25.811 Emergency exit marking., current as of Aug. 12, 2015, printed on Aug. 13, 2015, from Internet website at web address <http://www.ecfr.gov/cgi-bin/text-idx?c=ecfr&SID=67a8813bf9d9da0aa64e74e2e5ced957&rgn=div8&view=text&node=14:1.0.1.3.11.4.178.61&idno=14>, 2 pages.

MagnaClips web pages, 2013, printed on Jan. 12, 2014, from Internet website at web address <http://www.magnaclips.com>, 2 pages.

BugOffScreen web pages, copyright 1997-2013, printed on Jan. 12, 2014, from Internet website at web address <http://bugoffscreen.com/>, 5 pages.

USPTO Non-final office action, dated Nov. 9, 2012, for related U.S. Appl. No. 12/861,819, 26 pages.

USPTO Final office action, dated May 16, 2013, for related U.S. Appl. No. 12/861,819, 18 pages.

USPTO Non-final office action, dated Nov. 25, 2013, for related U.S. Appl. No. 12/861,819, 16 pages.

* cited by examiner

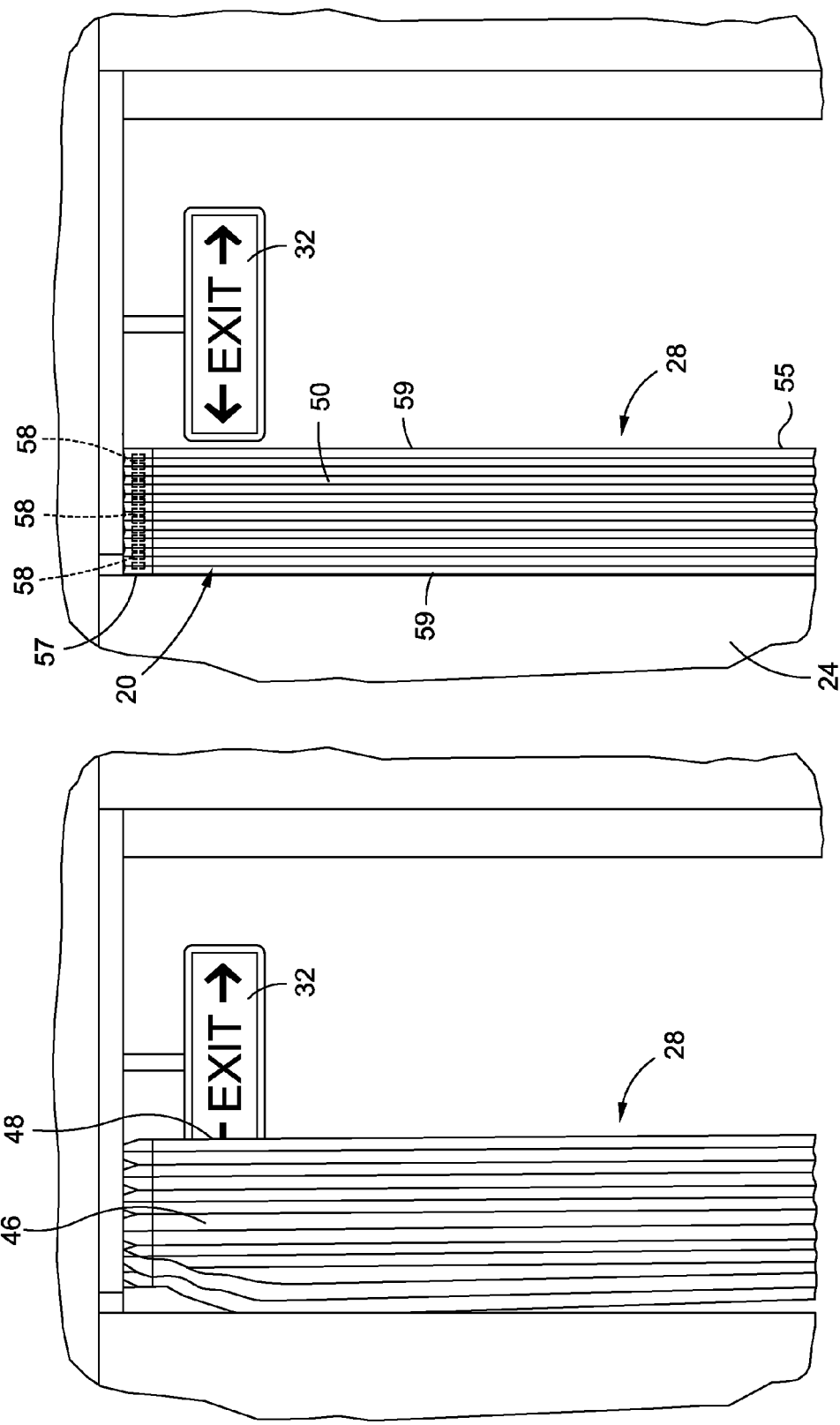

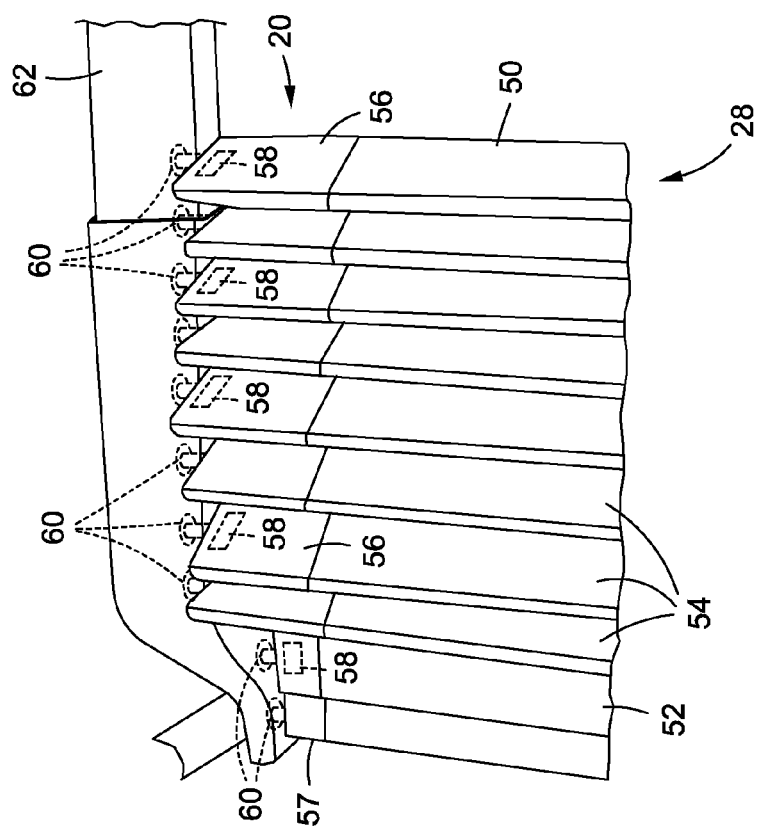
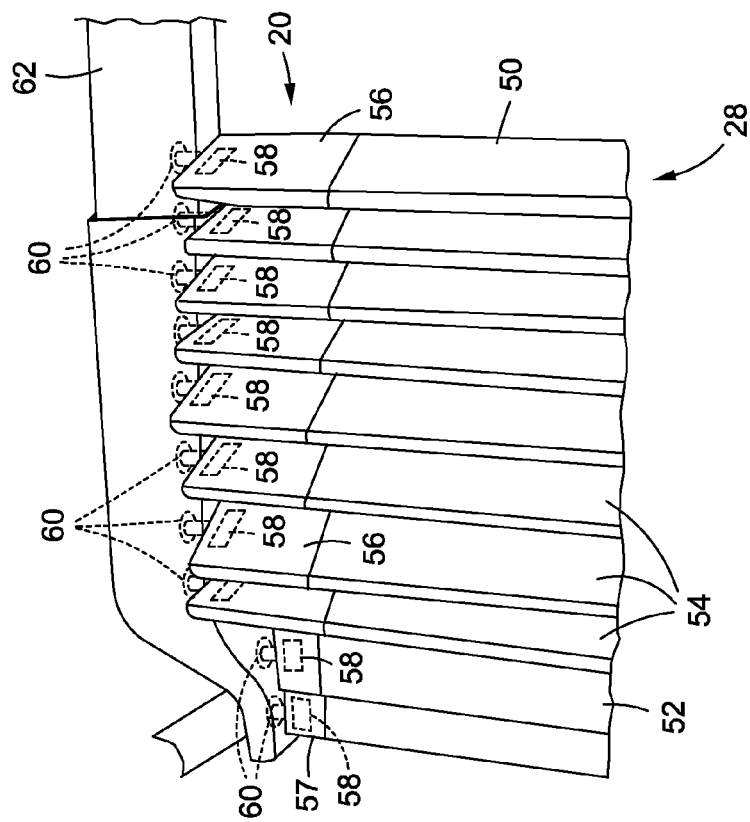

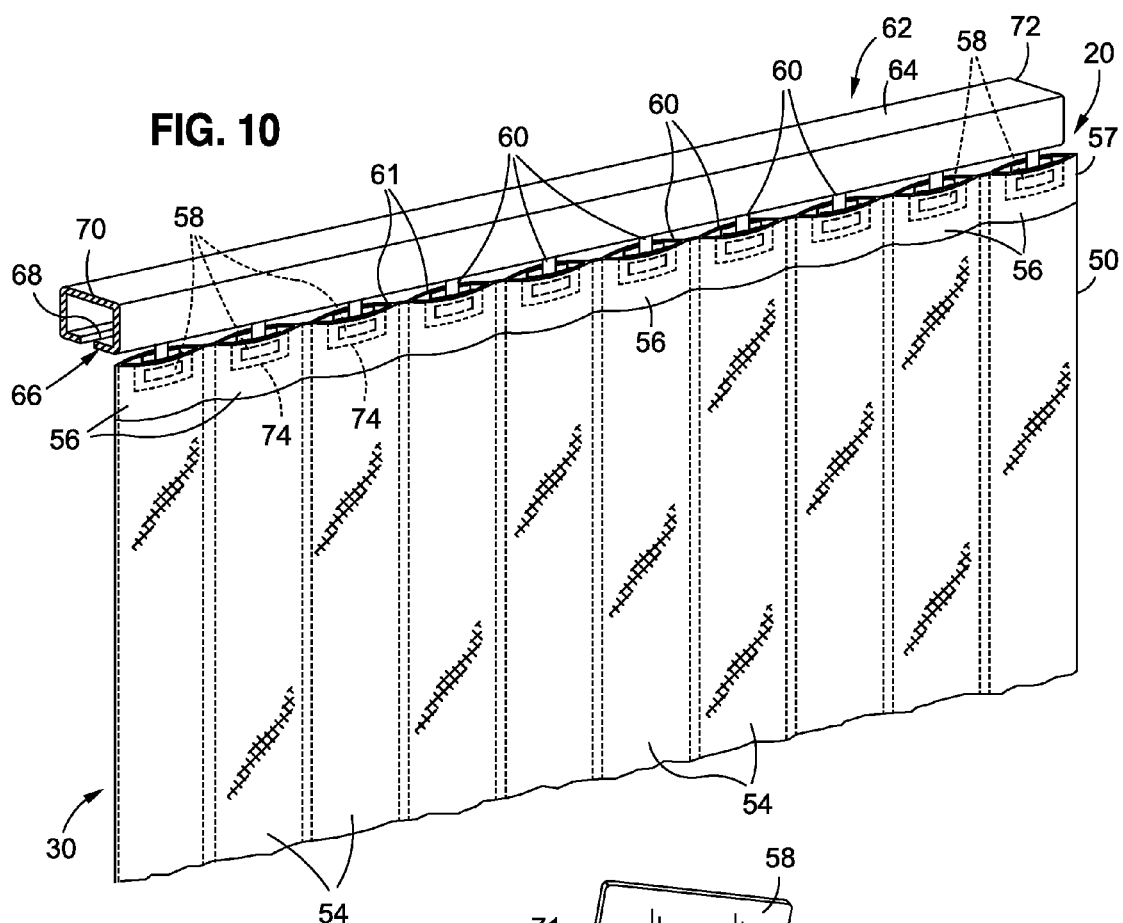
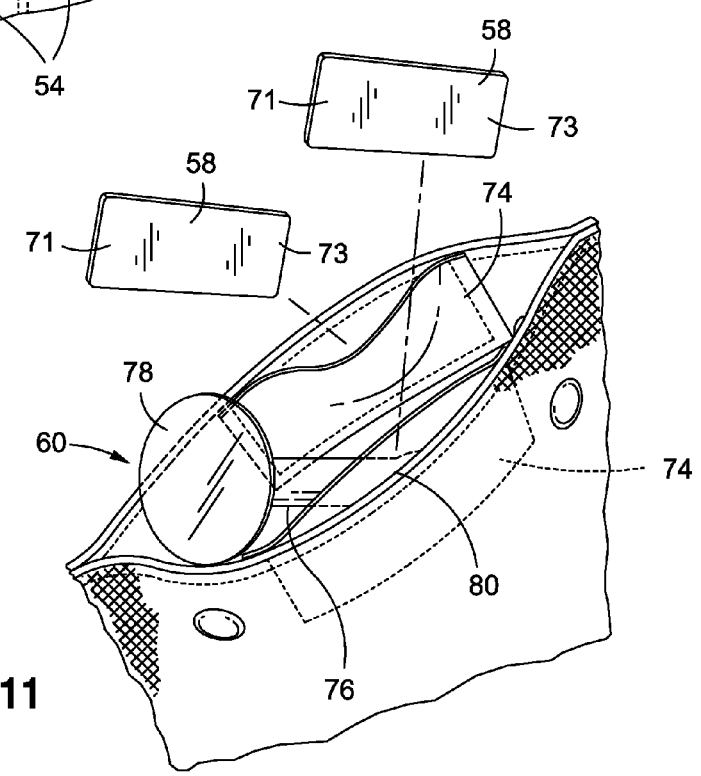

SYSTEM AND METHOD FOR INTEGRATED MAGNETIC SLIDER ASSEMBLY FOR HANGING PARTITION

CROSS-REFERENCE TO RELATED APPLICATION

This application claims priority to U.S. Provisional Patent Application Ser. No. 62/068,759, filed Oct. 26, 2014, which is incorporated herein by reference in its entirety.

FIELD

The disclosure relates generally to systems and methods for hanging partitions for use in vehicles, and more particularly, to systems and methods for slider assemblies for hanging partitions, such as curtains, for use in an aircraft.

BACKGROUND

Hanging partitions, such as curtains, drapery, screens, and the like, are used for numerous purposes, including separating or partitioning one physical area from another physical area, blocking unwanted light, and creating areas of privacy. In particular, hanging partitions, such as curtains used in commercial aircraft, can be used to partition one or more areas of a cabin of an aircraft, such as, for example, the first class or business class seating area from the economy class seating area and the passenger seating areas from the flight crew work areas or retreat quarters. Curtains on commercial aircraft are typically in a retracted or pulled back position during landings, take-offs, and stops by the aircraft and are typically in an expanded position during private hours, cruising altitude, and sleeping hours.

Known commercial aircraft curtains are generally long (36 inches to 84 inches in length) and are typically attached to an aircraft curtain rail with slider assemblies. Such known curtains are typically manually retracted by flight crew members by sliding the slider assemblies together along the curtain rail or by gathering the middle of the curtain and holding the curtain in place with a tie-back element that either closes with snaps or hook and loop fasteners. In addition, such known curtains often have to be adjusted by flight crew members so that the curtains hang straight and to minimize a wide stack-up of the curtain. This can increase the time and workload of the flight crew members.

Moreover, the ability of such known commercial aircraft curtains to stack up well and hang straight when retracted is important for safety as well as aesthetic reasons. Commercial aircraft are required to display emergency exit locator signs at various locations in the aircraft. Several of the emergency exit locator signs may be in proximity to the aircraft curtains. The Federal Aviation Administration (FAA) Federal Aviation Regulation (FAR) regarding emergency exit markings requires that the location of each passenger emergency exit be indicated by a sign visible to occupants approaching along the main passenger aisle or aisles (See 14 C.F.R. (Code of Federal Regulations) Section 25.811(d)). Known commercial aircraft curtains may hang loosely or have a wide stack-up when the curtains are in a retracted position, and such looseness and wide stack-up can result in obstruction of all or parts of the emergency exit locator signs which, upon inspection, can result in a violation of FAA Section 25.811(d).

In addition, when commercial aircraft experience turbulence, such turbulence can cause known commercial aircraft curtains to expand and have a wide stack-up and cause the slider assemblies that attach the aircraft curtains to the curtain rail to slide away when the gravity adjusts and expose the inner pleats of the aircraft curtain. Such wide stack-up can result in obstruction of all or parts of the emergency exit locator signs which, upon inspection, can result in a violation of FAA Section 25.811(d).

Further, known hanging partitions, such as commercial aircraft curtains, exist that include magnets within pockets of the hanging partitions but do not integrate the magnets into the slider assembly. Such known hanging partitions may require significant modification to existing hanging partitions that do not have magnets and may be limited as to new designs. This may result in increased expense and time.

Accordingly, there is a need in the art for an improved system and method for an integrated magnetic slider assembly for a hanging partition for use in vehicles such as aircraft that provides advantages over known systems and methods.

SUMMARY

This need for an improved system and method for an integrated magnetic slider assembly for a hanging partition for use in vehicles such as aircraft is satisfied.

In an embodiment of the disclosure, there is provided a system for an integrated magnetic slider assembly. The system comprises the integrated magnetic slider assembly. The integrated magnetic slider assembly comprises a slider portion, a hanger portion coupled to or integrated with the slider portion, and one or more magnets coupled to the hanger portion.

The system further comprises a longitudinal hanging device configured for coupling to and suspending the slider portion of the integrated magnetic slider assembly. The system further comprises at least one hanging partition configured for coupling to the hanger portion of the integrated magnetic slider assembly, the at least one hanging partition having a plurality of pleats. All the magnets in the integrated magnetic slider assembly are vertically aligned with respect to each other to cause a magnetic attraction between adjacent magnets in order to hold the plurality of pleats together, when the at least one hanging partition is in a retracted position.

In another embodiment of the disclosure, there is provided an aircraft. The aircraft comprises a fuselage having a cabin with a cabin ceiling and at least one wing coupled to the fuselage. The aircraft further comprises a system for an integrated magnetic slider assembly.

The system comprises the integrated magnetic slider assembly comprising a slider portion, a hanger portion coupled to or integrated with the slider portion, and one or more magnets coupled to the hanger portion. The system further comprises a longitudinal hanging device coupled to the cabin ceiling and configured for coupling to and suspending the slider portion of the integrated magnetic slider assembly.

The system further comprises at least one hanging partition configured for coupling to the hanger portion of the integrated magnetic slider assembly, the at least one hanging partition having a plurality of pleats. All the magnets in a plurality of integrated magnetic slider assemblies are vertically aligned with respect to each other to cause a magnetic attraction between adjacent magnets in order to hold the plurality of pleats together, when the at least one hanging partition is in a retracted position.

In another embodiment of the disclosure, there is provided an integrated magnetic slider assembly. The integrated magnetic slider assembly comprises a slider portion configured for suspension from a longitudinal hanging device. The integrated magnetic slider assembly further comprises a hanger portion coupled to or integrated with the slider portion. The hanger portion is configured for insertion within at least one hanging partition having a plurality of pleats.

The integrated magnetic slider assembly further comprises one or more magnets coupled to the hanger portion. When the integrated magnetic slider assembly is inserted within the at least one hanging partition, all the magnets in a plurality of integrated magnetic slider assemblies are vertically aligned with respect to each other to cause a magnetic attraction between adjacent magnets in order to hold the plurality of pleats together, when the at least one hanging partition is in a retracted position.

In another embodiment of the disclosure, there is provided a method of assembling a system for an integrated magnetic slider assembly. The method comprises the step of assembling a slider portion, a hanger portion coupled to or integrated with the slider portion, and one or more magnets coupled to the hanger portion, to form the integrated magnetic slider assembly. The method further comprises the step of coupling and suspending the slider portion of the integrated magnetic slider assembly to a longitudinal hanging device.

The method further comprises the step of coupling the hanger portion of the integrated magnetic slider assembly to at least one hanging partition having a plurality of pleats. The method further comprises the step of vertically aligning all the magnets in each integrated magnetic slider assembly with respect to each other to cause a magnetic attraction between adjacent magnets in order to hold the plurality of pleats together, when the at least one hanging partition is in a retracted position.

In an embodiment of the disclosure, there is provided a hanging partition. The hanging partition comprises at least one flexible, hanging panel having a plurality of pleats, each pleat having a hemmed portion. The hanging partition further comprises a plurality of magnets positioned within two or more of the hemmed portions. The hanging partition further comprises a plurality of hanging elements for suspending the hanging panel from a longitudinal hanging device. The magnets are aligned with respect to each other to cause a magnetic attraction between adjacent magnets in order to hold the hemmed portions together when the hemmed portions overlap when the hanging partition is in a retracted position.

In another embodiment of the disclosure, there is provided a magnetic curtain for partitioning at least two areas in a cabin of an aircraft. The magnetic curtain comprises at least one curtain panel made of a flame resistant material and having a plurality of pleats. Each pleat has an upper hemmed portion and each hemmed portion has at least one pocket. The magnetic curtain further comprises at least one magnet positioned in at least one pocket of each hemmed portion. The magnet is preferably made of an FAA approved magnetic material comprising neodymium, neodymium iron boron, hard ferromagnetic material, samarium cobalt, alnico, ceramic, ferrite, iron, nickel, alloys of rare earth metals, or another suitable FAA approved magnetic material. The magnetic curtain further comprises a plurality of glider elements for suspending the curtain panel from a longitudinal curtain rail. Each glider element has a first end coupled to the curtain rail, and each glider element has a second end coupled to the hemmed portion of each pleat via an attachment element. The magnets in adjacent pleats are aligned with respect to each other to cause a magnetic attraction between the adjacent magnets in order to hold the hemmed portions together when the hemmed portions overlap when the magnetic curtain is in a retracted position.

In another embodiment of the disclosure, there is provided a method of assembling a hanging partition. The method comprises providing a hanging panel having a plurality of pleats, each pleat having a hemmed portion. The method further comprises inserting a plurality of magnets within two or more of the hemmed portions. The method further comprises aligning the magnets within the hemmed portions in order to cause a magnetic attraction between adjacent magnets when the hemmed portions overlap when the hanging partition is in a retracted position. The method further comprises attaching to the hanging panel a plurality of hanging elements for suspending the hanging partition from a longitudinal hanging device.

In another embodiment of the disclosure, there is provided a method of assembling a magnetic curtain for partitioning at least two areas in a cabin of an aircraft. The method comprises providing a flame resistant curtain panel having a plurality of pleats, each pleat having an upper hemmed portion and each hemmed portion having at least one pocket. The method further comprises inserting at least one magnet into at least one pocket of each hemmed portion. The method further comprises aligning the magnets within the hemmed portions in order to cause a magnetic attraction between adjacent magnets and in order to automatically stack the hemmed portions together when the hemmed portions overlap when the magnetic curtain is in a retracted position. The method further comprises attaching to the curtain panel a plurality of glider elements for suspending the magnetic curtain from a longitudinal curtain rail, each glider element having a first end coupled to the curtain rail, and each glider element having a second end coupled to the hemmed portion of each pleat via an attachment element.

In another embodiment of the disclosure, there is provided a method for facilitating visibility of one or more emergency exit locator signs in a cabin of an aircraft. The method comprises providing a flame resistant curtain panel having a plurality of pleats, each pleat having an upper hemmed portion and each hemmed portion having at least one pocket that holds one or more magnets. The method further comprises aligning the magnets within the pockets of the hemmed portions in order to cause a magnetic attraction between adjacent magnets when the hemmed portions overlap. The method further comprises suspending the magnetic curtain from a longitudinal curtain rail with a plurality of hanging elements, such that the magnetic curtain partitions at least two areas in the cabin of the aircraft. The method further comprises retracting the magnetic curtain to a retracted position so that the hemmed portions are held together by the magnets, and so that the one or more emergency exit locator signs in the cabin of the aircraft are visible to occupants of the aircraft approaching the one or more emergency exit locator signs along an aisle of the aircraft.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein:

FIG. 6 is an illustration of a close-up front view of a prior art aircraft curtain partially obstructing an emergency exit locator sign;

FIG. 7 is an illustration of a close-up front view of one of the embodiments of the hanging partition of the disclosure in a retracted position;

FIG. 8 is an illustration of a close-up perspective view of the upper portion of one of the embodiments of the hanging partition of the disclosure in a retracted position with magnets positioned in every pleat;

FIG. 9 is an illustration of a close-up perspective view of the upper portion of another embodiment of the hanging partition of the disclosure in a retracted position with magnets positioned in alternating pleats;

FIG. 10 is an illustration of a close-up perspective view of the upper portion of another embodiment of the hanging partition of the disclosure in an extended position with the magnets positioned in pockets in the pleats;

FIG. 11 is an illustration of a close-up perspective view of the magnets that are positioned in pockets of a pleat;

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

Figure 1:
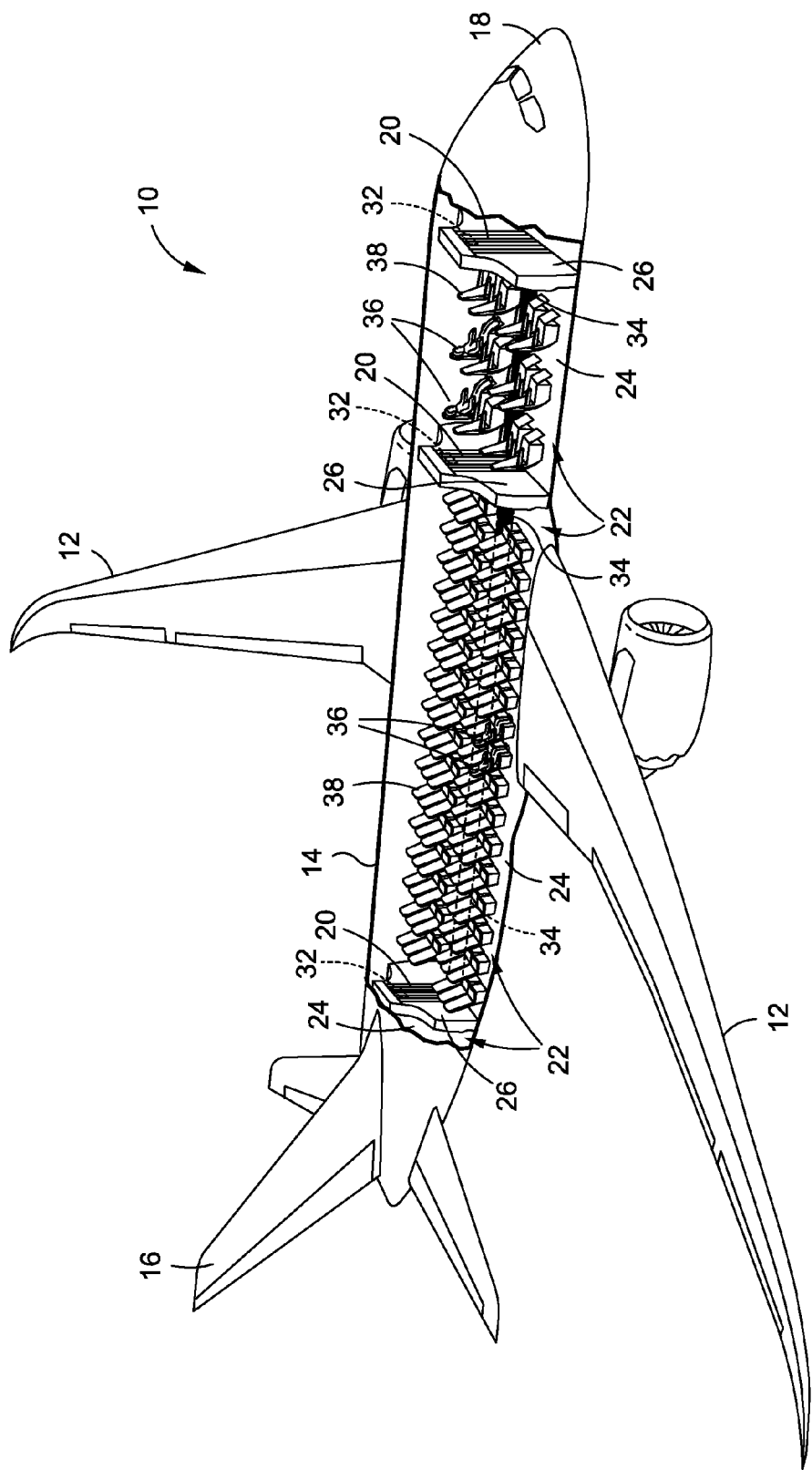
FIG. 1 is an illustration of a perspective view of an aircraft which may incorporate one or more advantageous embodiments of the hanging partition of the disclosure.

FIG. 1 is an illustration of a perspective view of an aircraft 10 which includes such component parts as wings 12, a fuselage 14, a tail 16, and a nose 18. The aircraft 10 may incorporate one or more advantageous embodiments of a hanging partition 20 of the disclosure as discussed in detail below. Although the hanging partition 20 is shown in an exemplary embodiment as used in the aircraft 10, the hanging partition 20 may also be used in other vehicles (not shown), such as rotorcraft, watercraft, trains, buses, recreational vehicles, trucks, and other suitable vehicles or structures.

Figure 2:
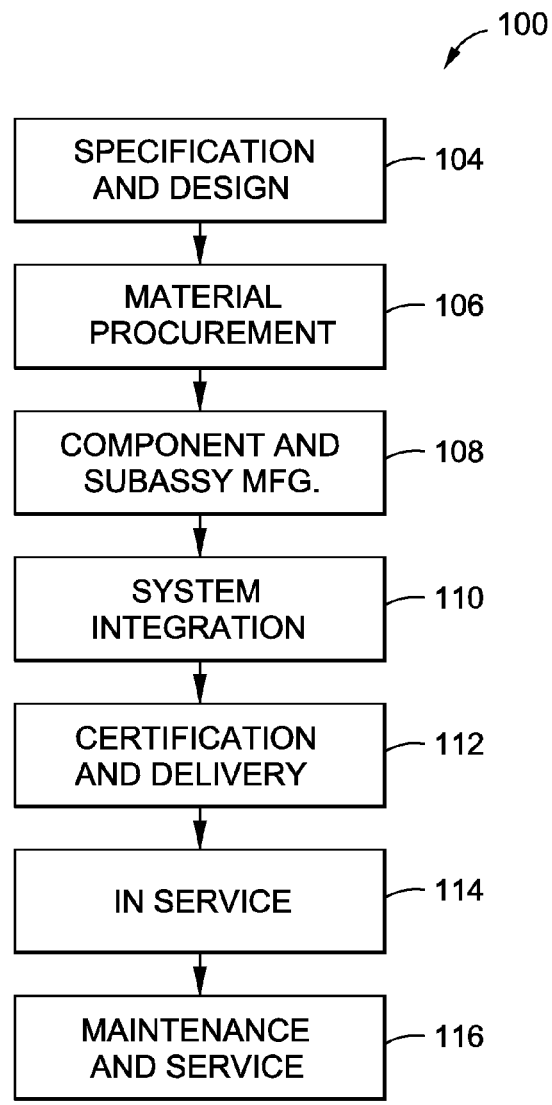
FIG. 2 is an illustration of a flow diagram of an aircraft production and service method.
Figure 3:
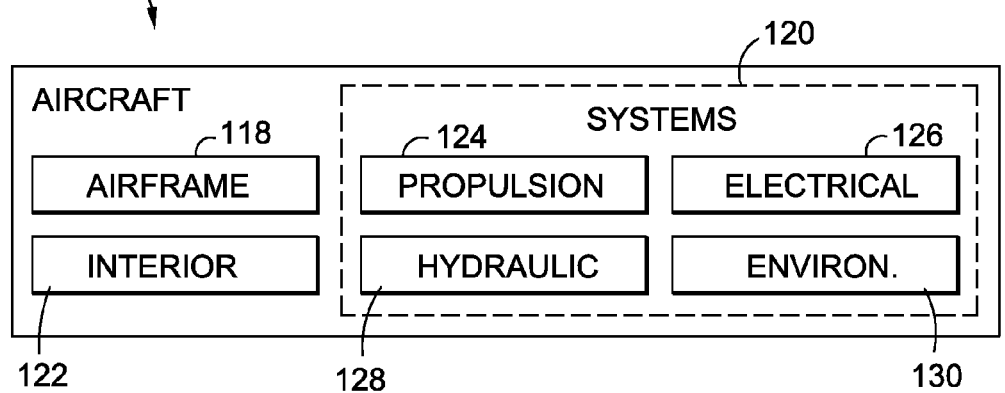
FIG. 3 is an illustration of a functional block diagram of an aircraft.

FIG. 2 is a flow diagram of an aircraft production and service method 100. FIG. 3 is a block diagram of an aircraft 102. Referring to FIGS. 2-3, embodiments of the disclosure may be described in the context of the aircraft manufacturing and service method 100 as shown in FIG. 2 and the aircraft 102 as shown in FIG. 3. During pre-production, exemplary method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and other suitable services).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and other suitable operators.

As shown in FIG. 3, the aircraft 102 produced by exemplary method 100 may include an airframe 118 with a plurality of systems 120 and an interior 122. Examples of high-level systems 120 include one or more of a propulsion system 124, an electrical system 126, a hydraulic system 128, and an environmental system 130. Any number of other systems may be included. Although an aerospace example is shown, the principles of the invention may be applied to other industries, such as the automotive industry.

Methods and systems embodied herein may be employed during any one or more of the stages of the production and service method 100. For example, components or subassemblies corresponding to component and subassembly manufacturing 108 may be fabricated or manufactured in a manner similar to components or subassemblies produced while the aircraft 102 is in service. Also, one or more apparatus embodiments, method embodiments, or a combination thereof, may be utilized during component and subassembly manufacturing 108 and system integration 110, for example, by substantially expediting assembly of or reducing the cost of the aircraft 102. Similarly, one or more of apparatus embodiments, method embodiments, or a combination thereof, may be utilized while the aircraft 102 is in service, for example and without limitation, to maintenance and service 116.

Figure 4:
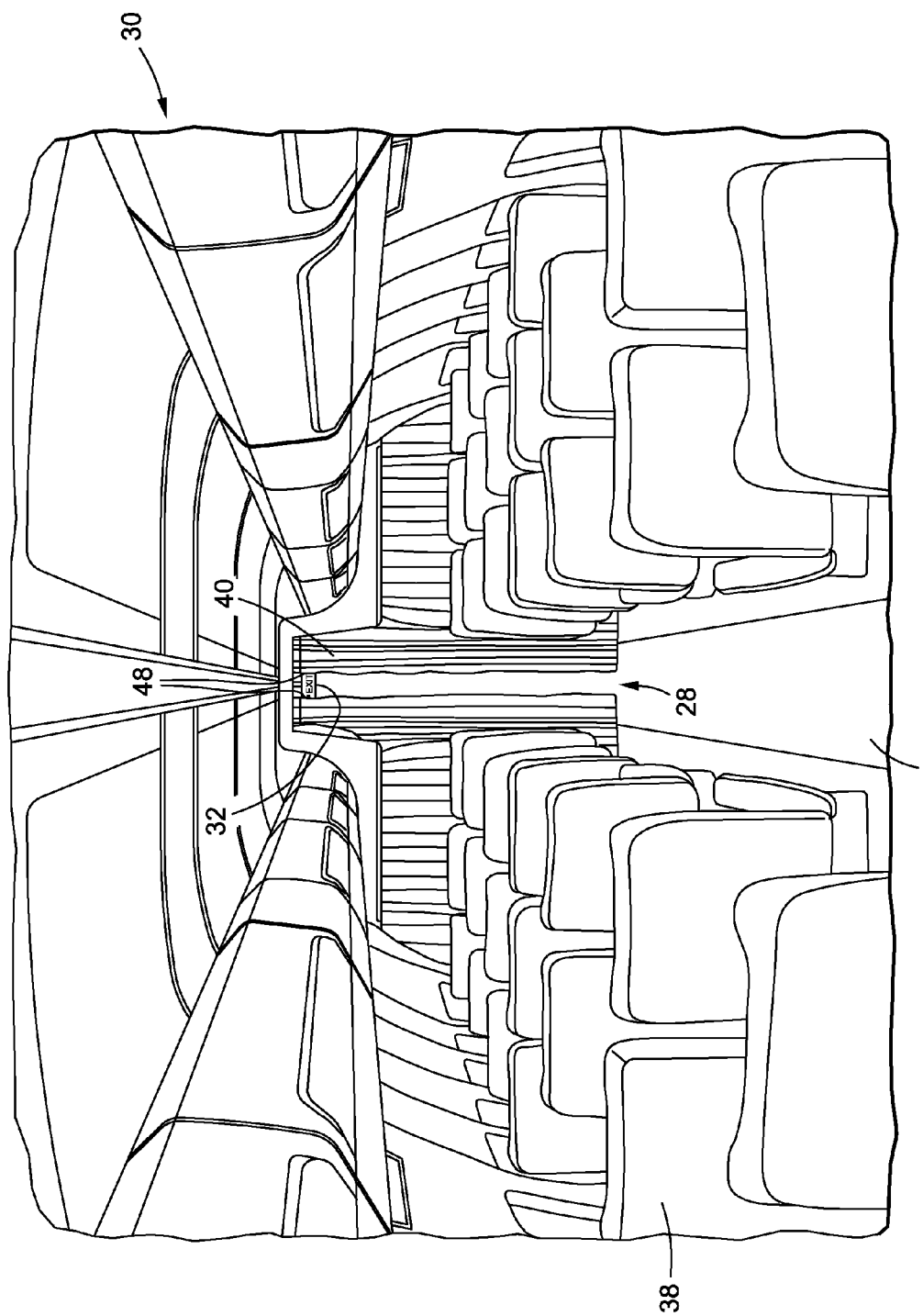
FIG. 4 is an illustration of a prior art aircraft curtain partially obstructing an emergency exit locator sign.
Figure 5:
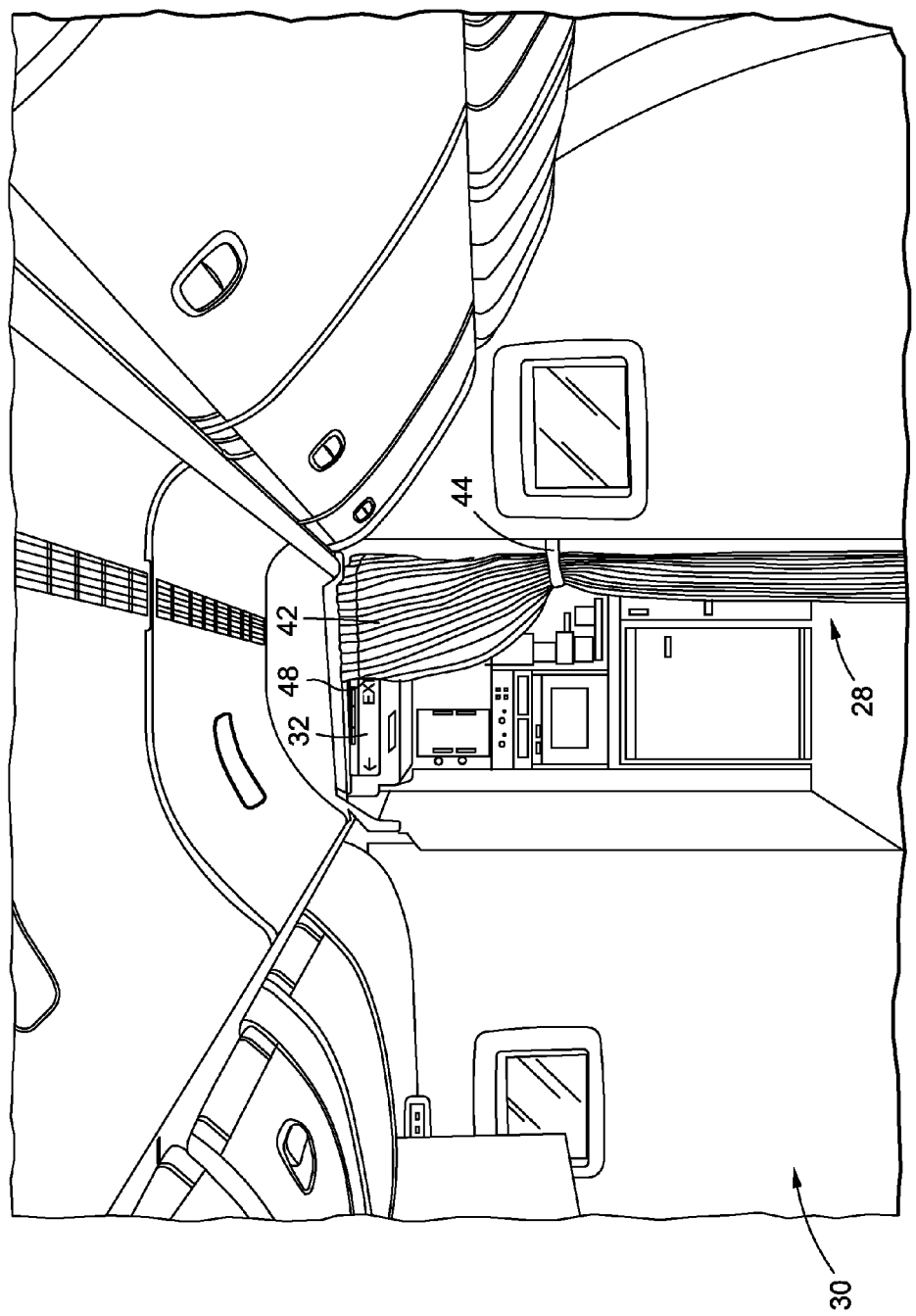
FIG. 5 is an illustration of another prior art aircraft curtain partially obstructing an emergency exit locator sign.

FIG. 4 is an illustration of a prior art aircraft curtain 40 shown partially obstructing a portion 48 of an emergency exit locator sign 32 when the aircraft curtain 40 is in a retracted position 28, such that it would be difficult for occupants 36 (see FIG. 1) in seats 38 to see the emergency exit locator sign 32. FIG. 5 is an illustration of another prior art aircraft curtain 42 having a tie-back element 44 where the aircraft curtain 42 is shown partially obstructing portion 48 of the emergency exit locator sign 32 when the aircraft curtain 42 is in retracted position 28. FIG. 6 is an illustration of a close-up front view of a prior art aircraft curtain 46 shown partially obstructing portion 48 of the emergency exit locator sign 32 when the aircraft curtain 46 is in retracted position 28.

FIG. 7 is an illustration of a close-up front view of one of the embodiments of the hanging partition 20 of the disclosure in the retracted position 28. Preferably, the hanging partition 20 is in the form of a curtain 50. However, the hanging partition 20 may also comprise drapery, a screen, or another suitable form. Preferably, the material used for the hanging partition 20 is FAA (Federal Aviation Administration) approved and has passed ASTM-84E Surface Burning Test or UL-94VO Flammability Test. Preferably, the hanging partition 20 is made of an FAA approved material comprising a flame resistant fabric material such as a flame resistant wool material, a flame resistant polyester material, a flame resistant nylon material, or another suitable flame resistant material. Preferably, the hanging partition 20 partitions at least two cabin areas 24 (see FIG. 1) in a cabin 22 (see FIG. 1) of a vehicle such as aircraft 10 (see FIG. 1). When the hanging partition 20 is in the retracted position 28, the hanging partition 20 does not obstruct an emergency exit locator sign 32 that may be in close proximity to the hanging partition 20 in the aircraft 10. Typically, the emergency exit locator signs 32 are suspended overhead and behind the hanging partition 20 in the aircraft 10 or in another location of close proximity.

As shown in FIG. 8, the hanging partition 20 comprises at least one flexible hanging panel 52 having a plurality of pleats 54. Each pleat 54 has a hemmed portion 56. The hanging panel 52 has a lower portion 55, an upper portion 57, and side portions 59 (see FIG. 7). Preferably, the hemmed portions 56 are positioned along the upper portion 57 of the hanging panel 52. A plurality of magnets 58 are positioned within two or more of the hemmed portions 56. Preferably, each hemmed portion 56 holds one or more magnets 58 (see FIG. 8). However, as shown in FIG. 9, the magnets 58 may be positioned in alternating hemmed portions 56 of the pleats 54 or in randomly selected hemmed portions 56 of the pleats 54, depending on the strength of attraction between adjacent or succeeding magnets 58 and depending on the weight and thickness of the material or fabric used for the hanging panel 52. Whether the magnets are in every pleat or every other pleat or in random pleats depends on the strength of attraction between the adjacent or succeeding magnets based on the variation of thickness and fabric of the hanging panel of the hanging partition 20.

It is desirable to use magnets in the hanging partition 20 having a magnetic field that does not interfere with any electrical or electronic systems on the aircraft 10. The number of magnets 58 needed preferably equals the distance necessary for the maximum attraction between adjacent or succeeding magnets 58 in succession in the hemmed portions 56. Each hemmed portion 56 may further comprise at least one pocket 74 (see FIG. 11) for holding the one or more magnets 58. The magnets 58 are preferably hidden in the hemmed portions 56 of the pleats 54 of the hanging partition 20 to maintain an aesthetically pleasing visual look to the hanging partition 20.

FIG. 8 is an illustration of a close-up perspective view of the upper portion 57 of one of the embodiments of the hanging partition 20 of the disclosure in the retracted position 28 with the magnets 58 positioned in every pleat 54. FIG. 9 is an illustration of a close-up perspective view of the upper portion 57 of another embodiment of the hanging partition 20 of the disclosure in the retracted position 28 with the magnets 58 positioned in alternating pleats 54. FIG. 10 is an illustration of a close-up perspective view of the upper portion 57 of another embodiment of the hanging partition 20 of the disclosure in an extended position 30 with the magnets 58 positioned in the pockets 74 in the pleats 54. FIG. 11 is an illustration of a close-up perspective view of the magnets 58 that are positioned in the pockets 74 of the pleat 54.

Figure 13:
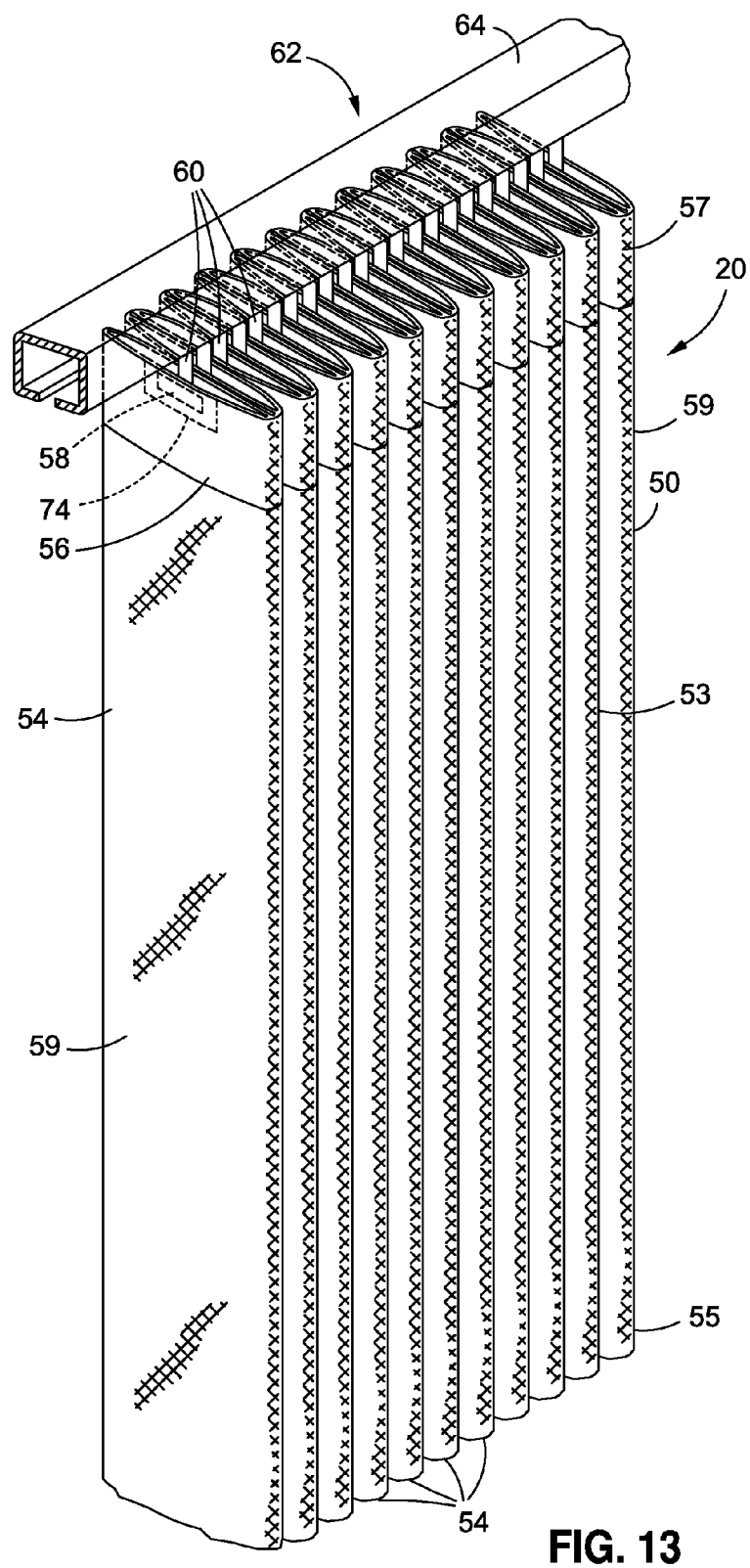
FIG. 13 is an illustration of a perspective view of one of the embodiments of the hanging partition of the disclosure in a retracted position having magnets positioned in pockets in the pleats.

The magnets 58 are preferably aligned or arranged with respect to each other so as to cause a magnetic attraction between adjacent or succeeding magnets 58 in order to hold the hemmed portions 56 together when the hemmed portions 56 overlap and when the hanging partition 20 is in the retracted position 28. As shown in FIG. 13, the magnets 58 are also preferably aligned or arranged with respect to each other in order to automatically stack the hemmed portions 56 together when the hanging partition 20 is in the retracted position 28. As shown in FIG. 11, each magnet 58 has a north pole surface 71 and a south pole surface 73. The magnets 58 must be aligned with respect to each other such that the north pole surface 71 of one magnet 58 is aligned with the south pole surface 73 of the adjacent magnet 58 so as not to repel each other.

The magnets 58 may comprise an FAA approved magnetic material such as neodymium, neodymium iron boron, hard ferromagnetic material, samarian cobalt, alnico, ceramic, ferrite, iron, nickel, alloys of rare earth metals, or another suitable FAA approved magnetic material. Preferably, the magnets 58 comprise neodymium. An example of a suitable type of magnet that may be used in the hanging partition 20 of the disclosure includes a neodymium rectangle magnet obtained from Adams Magnetic Products Co. of Elmhurst, Ill., having dimensions of 0.055 inch thick by 0.5 inch wide by 1.00 inch long and having a weight of 0.125 pounds.

Figure 15A:
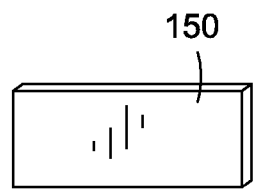
FIG. 15A is an illustration of one embodiment of a magnet in the form of a rectangle that may be used in the hanging partition of the disclosure.
Figure 15B:
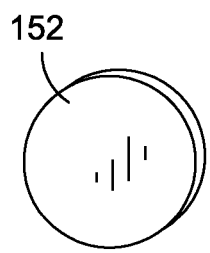
FIG. 15B is an illustration of one embodiment of a magnet in the form of a disk that may be used in the hanging partition of the disclosure.
Figure 15C:
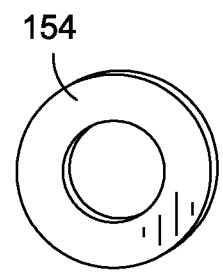
FIG. 15C is an illustration of one embodiment of a magnet in the form of a donut that may be used in the hanging partition of the disclosure.
Figure 15D:
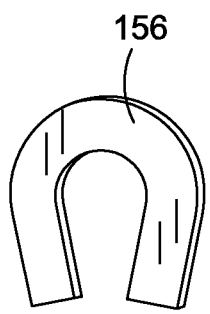
FIG. 15D is an illustration of one embodiment of a magnet in the form of a horseshoe that may be used in the hanging partition of the disclosure.
Figure 15E:
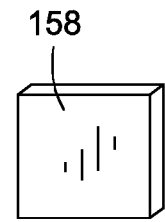
FIG. 15E is an illustration of one embodiment of a magnet in the form of a square that may be used in the hanging partition of the disclosure.
Figure 15F:
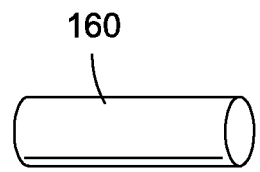
FIG. 15F is an illustration of one embodiment of a magnet in the form of a cylinder that may be used in the hanging partition of the disclosure.
Figure 15G:
FIG. 15G is an illustration of one embodiment of a magnet in the form of a ball that may be used in the hanging partition of the disclosure.
Figure 15H:
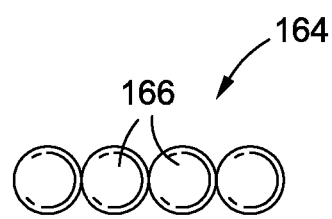
FIG. 15H is an illustration of one embodiment of a magnet in the form of a string of beads that may be used in the hanging partition of the disclosure.
Figure 15I:
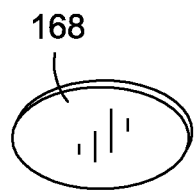
FIG. 15I is an illustration of one embodiment of a magnet in the form of a oval that may be used in the hanging partition of the disclosure.

FIGS. 15A-15I show various magnet configurations that may be used for the magnets 58 used with the hanging partition 20. However, other suitable configurations may also be used. FIG. 15A is an illustration of one embodiment of a magnet 58 in the form of a rectangle 150 that may be used in the hanging partition 20 of the disclosure. FIG. 15B is an illustration of one embodiment of a magnet 58 in the form of a disk 152 that may be used in the hanging partition 20 of the disclosure. FIG. 15C is an illustration of one embodiment of a magnet 58 in the form of a donut 154 that may be used in the hanging partition 20 of the disclosure. FIG. 15D is an illustration of one embodiment of a magnet 58 in the form of a horseshoe 156 that may be used in the hanging partition 20 of the disclosure. FIG. 15E is an illustration of one embodiment of a magnet 58 in the form of a square 158 that may be used in the hanging partition 20 of the disclosure. FIG. 15F is an illustration of one embodiment of a magnet 58 in the form of a cylinder 160 that may be used in the hanging partition 20 of the disclosure. FIG. 15G is an illustration of one embodiment of a magnet 58 in the form of a ball 162 that may be used in the hanging partition 20 of the disclosure. FIG. 15H is an illustration of one embodiment of a magnet 58 in the form of a string 164 of beads 166 that may be used in the hanging partition 20 of the disclosure. FIG. 15I is an illustration of one embodiment of a magnet 58 in the form of an oval 168 that may be used in the hanging partition 20 of the disclosure.

Figure 12:
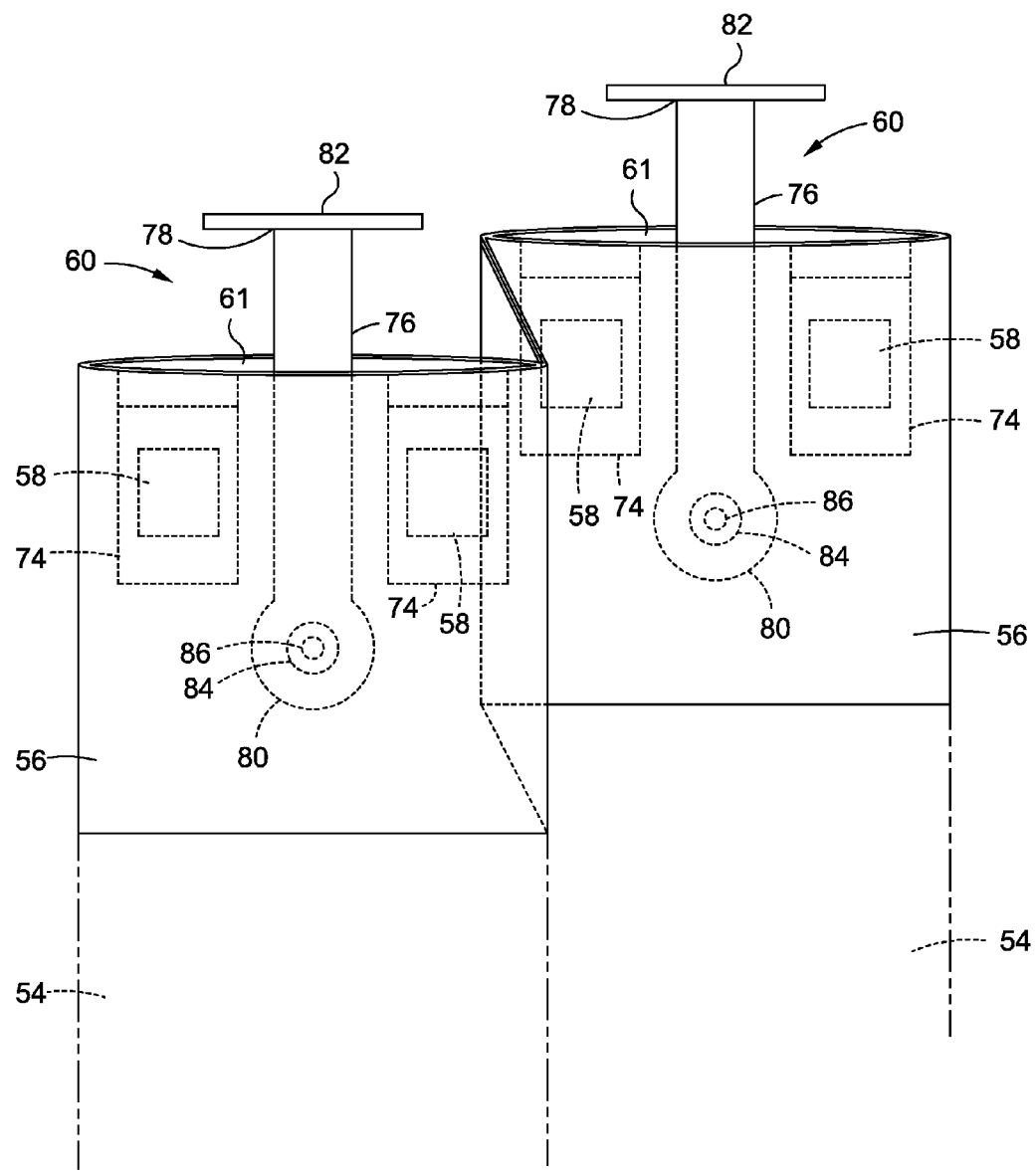
FIG. 12 is an illustration of a close-up plan view of the hanging element attached to the pleat with the magnets on each side of the hanging element.

FIG. 12 is an illustration of a close-up plan view of hanging element 60 attached to the pleat 54 with the magnets 58 on each side of the hanging element 60. As shown in FIG. 12, the hanging partition 20 further comprises a plurality of hanging elements 60 for suspending the hanging panel 52 from a longitudinal hanging device 62. Preferably, the hanging element 60 comprises a glider element 76. Preferably, the glider element 76 is of a monolithic or unitary, and continuous configuration and is formed of a rigid plastic material such as nylon 6/6 (polyhexamethylene adiptimide). However, the glider element may also be formed of any natural or man-made material, such as a substantially rigid material or a flexible plastic, metal, wood, or another suitable material. Preferably, the hanging element 60 is formed of a material having a tensile strength greater than the tear strength of the hanging panel 52. Each hanging element 60 has a first end 78 coupled to the curtain rail 64 of the longitudinal hanging device 62. The first end 78 may comprise a head portion 82. Each hanging element 60 has a second end 80 coupled to the hemmed portion 56 of each pleat 54 via an attachment element 84. The attachment element 84 may comprise a snap 86. Alternatively, the attachment element 84 may comprise a hook and loop fastener (Velcro) (not shown), a hook (not shown), a clip (not shown), a clamp (not shown), a latch (not shown), or another suitable attachment element.

Figure 14:
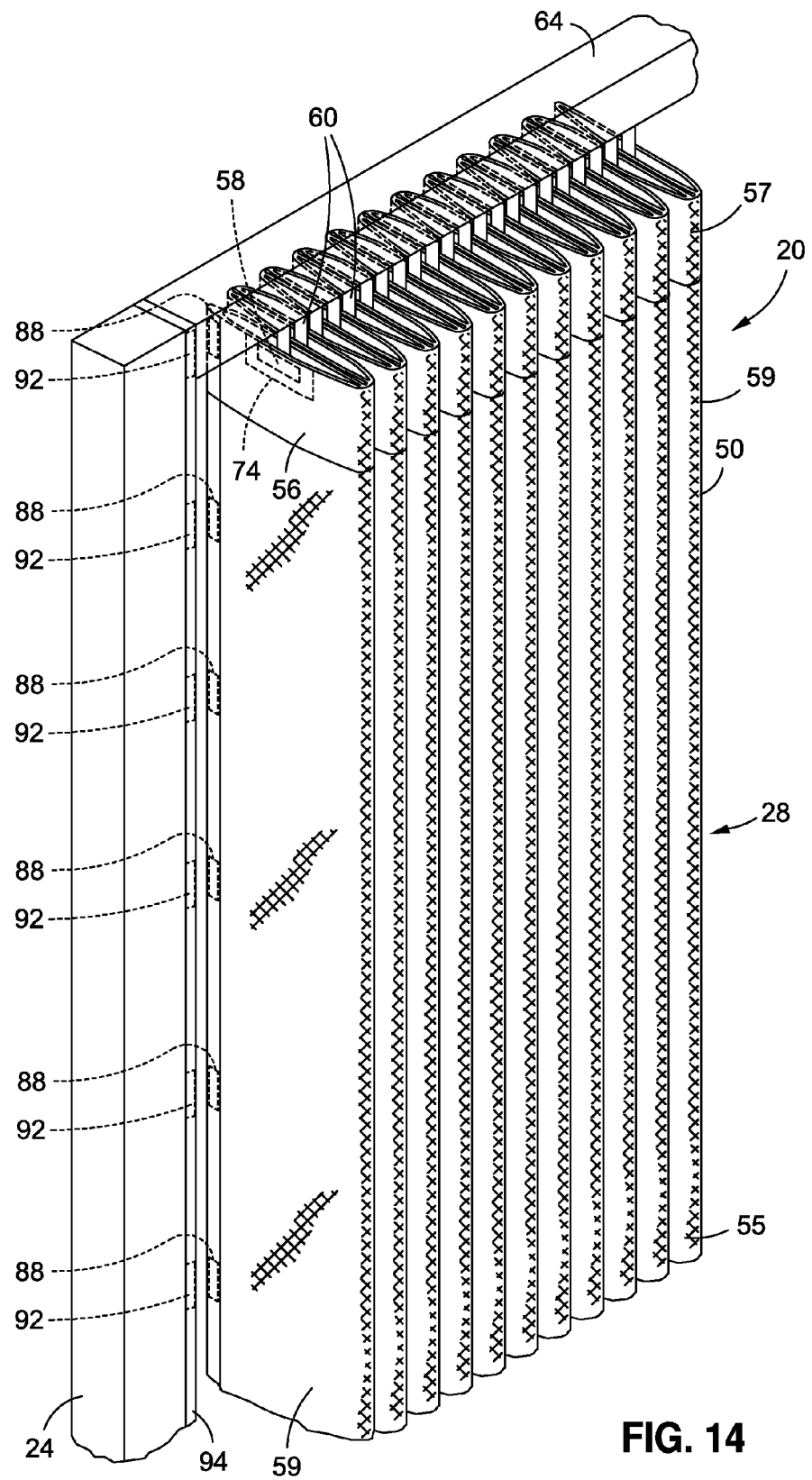
FIG. 14 is an illustration of a perspective view of another embodiment of the hanging partition of the disclosure in a retracted position and having side magnets coupled to a side rail.

FIG. 14 is an illustration of a perspective view of another embodiment of the hanging partition 20 in the retracted position 28 and having additional side magnets 88 that may be coupled to a side rail 94 of the aircraft 10 (not shown). As shown in FIG. 14, one of the side portions 59 of the hanging partition 20 may comprise one or more side magnets 88 having a surface that is attracted to and is designed to couple to one or more corresponding magnetic portions 92 on the side rail 94 of a partitioning wall 26, such as partitioning wall 26 in aircraft 10 (see FIG. 1). The magnetic portions 92 may comprise a ferrous material, a corresponding side rail magnet, or another suitable magnetic material.

Figure 16:
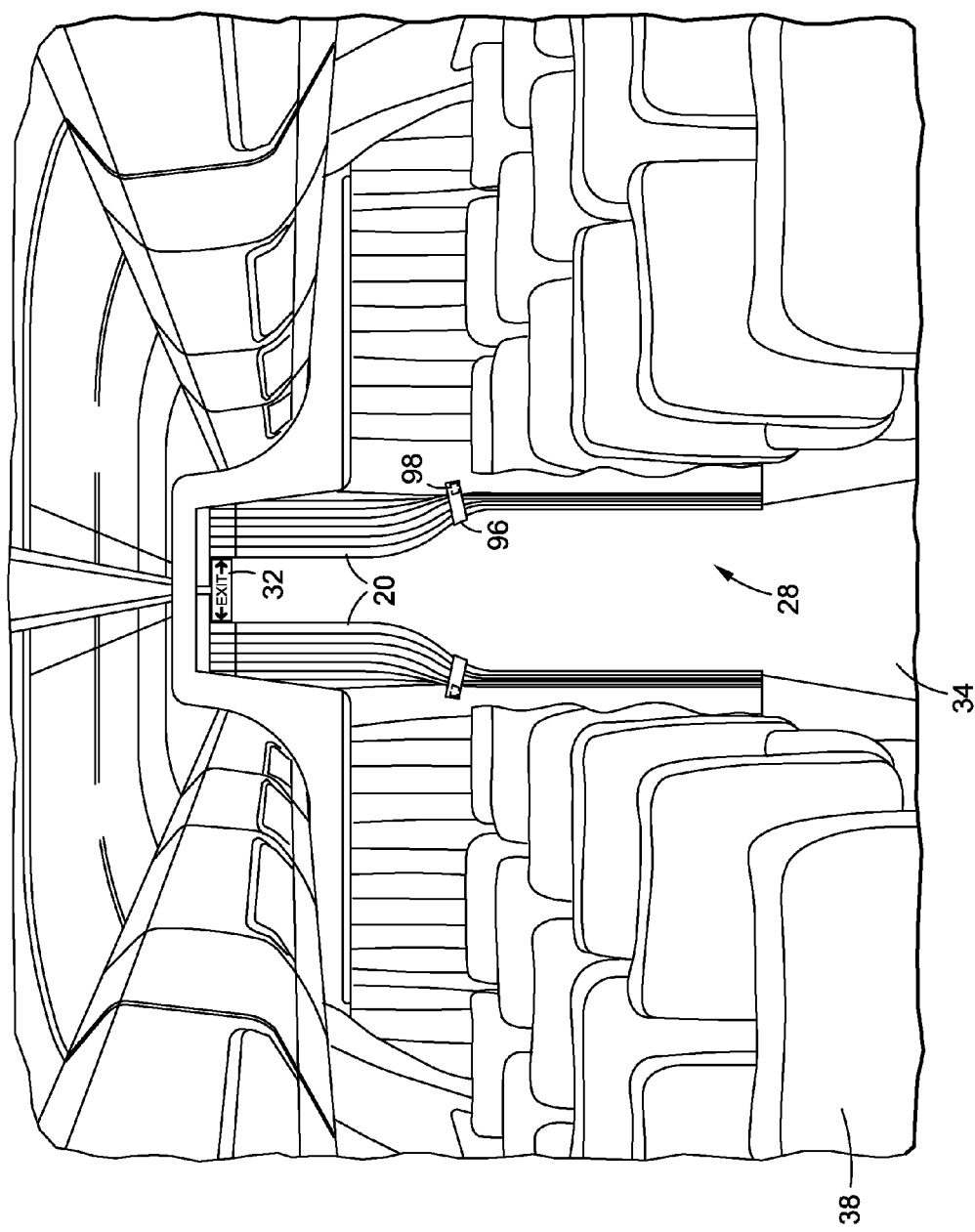
FIG. 16 is an illustration of a perspective view of another embodiment of the hanging partition of the disclosure in a retracted position and having magnetic tie-backs.

As shown in FIG. 16, in another embodiment, the hanging partition 20 may further comprise one or more magnetic tie-back elements 96 having one or more magnets 98 to tie back the hanging partition 20 in the retracted position 28. FIG. 16 is an illustration of a perspective view of the hanging partition 20 in the retracted position 28 and having the magnetic tie-back elements 96 with one or more magnets 98. The emergency exit locator sign 32 (see FIG. 16) is clearly visible when the hanging partition 20 (see FIG. 16) is in the retracted position 28 (see FIG. 16), such that occupants 36 (see FIG. 1) in seats 38 (see FIG. 16) may easily see the emergency exit locator sign 32 (see FIG. 16) in order to exit down the aisle 34 (see FIG. 16) in the direction of the emergency exit locator sign 32 (see FIG. 16), if necessary.

FIG. 13 is an illustration of a perspective view of another embodiment of the hanging partition 20, in the form of magnetic curtain 50, in the retracted position 28 and having the magnets 58 positioned in the pockets 74 in the hemmed portions 56 of the pleats 54. The magnetic curtain 50 is preferably used for partitioning at least two cabin areas 24 in the cabin 22 of an aircraft 10 (see FIG. 1). As shown in FIG. 13, the magnetic curtain 50 comprises at least one curtain panel 53 made of a flame resistant material and having a plurality of pleats 54. Each pleat 54 has a hemmed portion 56 in an upper portion 57 of the curtain panel 53, and each hemmed portion 54 has at least one pocket 74. The magnetic curtain 50 further comprises at least one magnet 58 positioned in at least one pocket 74 of each hemmed portion 56. The magnet 58 is preferably made of an FAA approved magnetic material comprising neodymium, neodymium iron boron, hard ferromagnetic material, samarium cobalt, alnico, ceramic, ferrite, iron, nickel, alloys of rare earth metals, or another suitable FAA approved magnetic material. The magnetic curtain 50 further comprises a plurality of hanging elements 60, preferably in the form of glider elements 76, for suspending the curtain panel 53 from a longitudinal curtain rail 64 of the longitudinal hanging device 62. Each glider element 76 has a first end 78 coupled to the curtain rail 64, and each glider element 76 has a second end 80 coupled to the hemmed portion 56 of each pleat 54 via an attachment element 84. The attachment element 84 may comprise a snap 86. Alternatively, the attachment element 84 may comprise a hook and loop fastener (Velcro) (not shown), a hook (not shown), a clip (not shown), a clamp (not shown), a latch (not shown), or another suitable attachment element. The magnets 58 in adjacent pleats 54 are aligned with respect to each other to cause or create a magnetic attraction between the adjacent magnets 58 in order to hold the hemmed portions 56 together when the hemmed portions 56 overlap and when the magnetic curtain 50 is in the retracted position 28.

Figure 17:
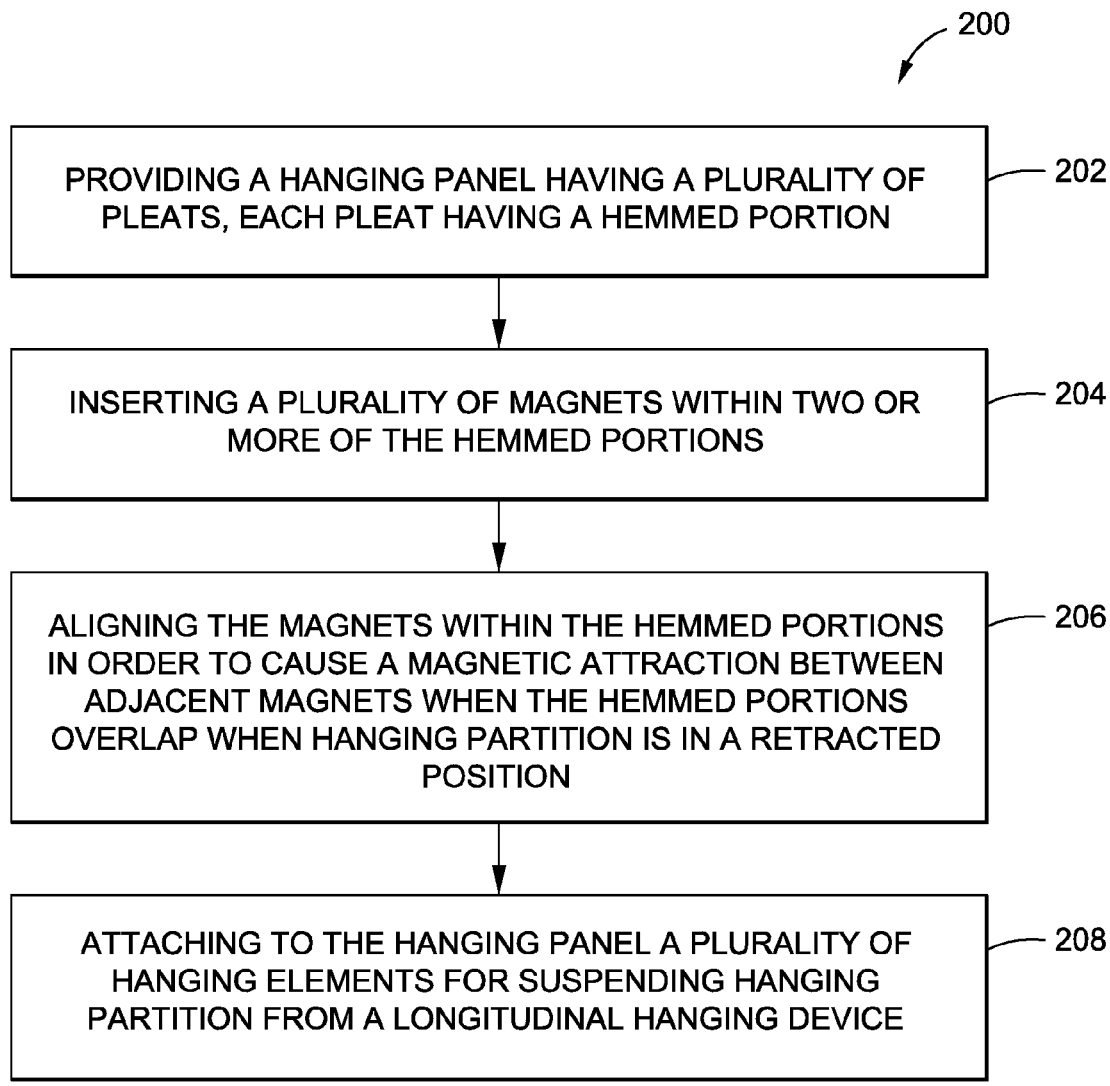
FIG. 17 is an illustration of a flow diagram of an embodiment of a method of the disclosure.

In another embodiment of the disclosure, there is provided a method 200 of assembling a hanging partition 20 (see FIG. 17). FIG. 17 is an illustration of a flow diagram of the method 200 of the disclosure. The method 200 comprises step 202 of providing a hanging panel 52 having a plurality of pleats 54, each pleat 54 having a hemmed portion 56 (see FIG. 10). The method 200 further comprises step 204 of inserting a plurality of magnets 58 within two or more of the hemmed portions 56 (see FIG. 10). The method 200 further comprises step 206 of aligning the magnets 58 within the hemmed portions 56 in order to cause or create a magnetic attraction between adjacent magnets 58, when the hemmed portions 56 overlap and when the hanging partition 20 is in the retracted position 28 (see FIG. 8-9, 13). The method 200 further comprises step 208 of attaching to the hanging panel 52 a plurality of hanging elements 60 for suspending the hanging partition 20 from a longitudinal hanging device 62 (see FIG. 10).

Figure 18:
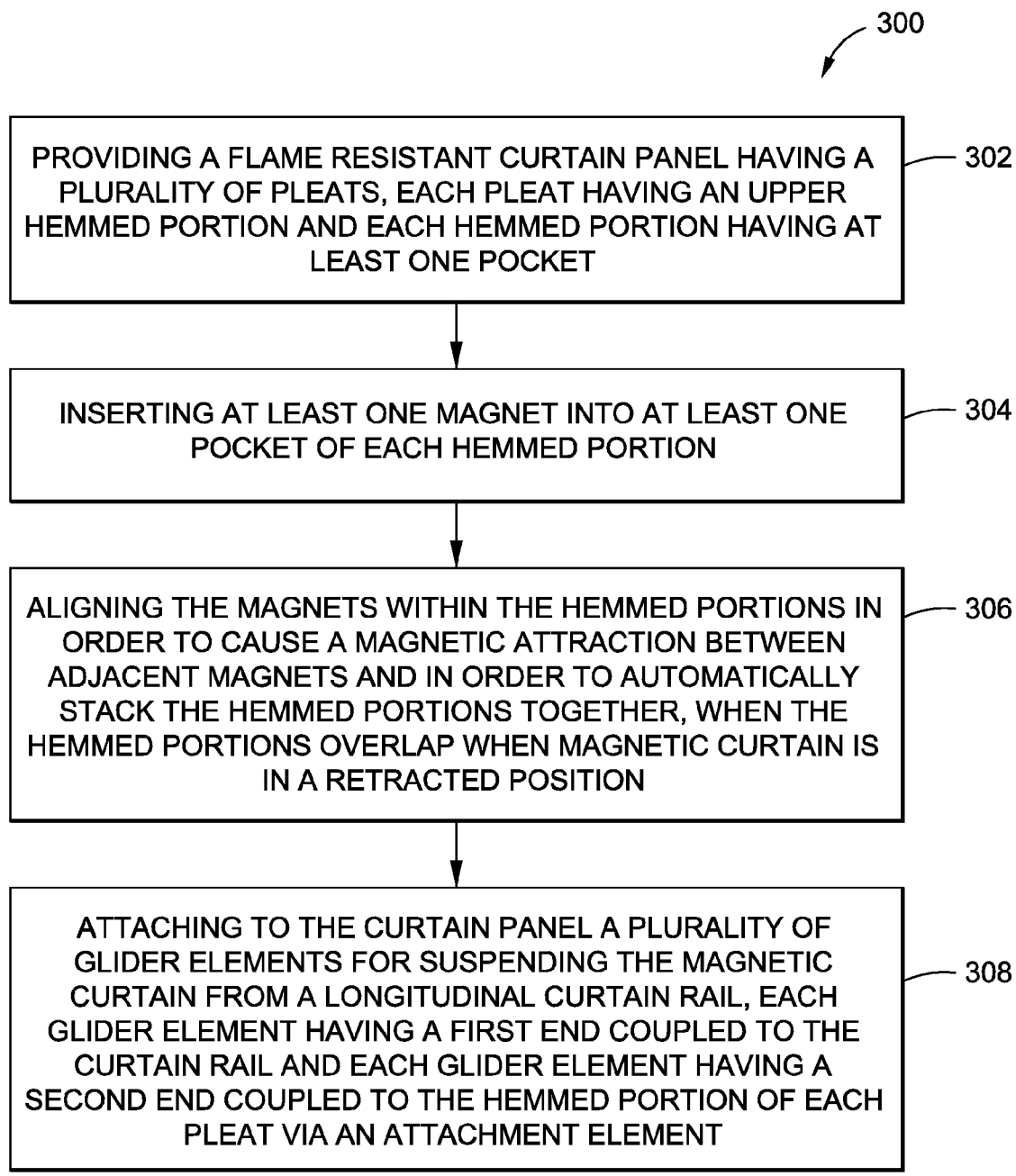
FIG. 18 is an illustration of a flow diagram of another embodiment of a method of the disclosure; and, FIG. 19 is an illustration of a flow diagram of another embodiment of a method of the disclosure.

In another embodiment of the disclosure, there is provided a method 300 of assembling a magnetic curtain 50 for partitioning at least two cabin areas 24 in a cabin 22 of an aircraft 10 (see FIGS. 1, 13). FIG. 18 is an illustration of a flow diagram of the method 300 of the disclosure. The method 300 comprises step 302 of providing a flame resistant curtain panel 53 having a plurality of pleats 54, each pleat 54 having a hemmed portion 56 in the upper portion 57 of the curtain panel 53, and each hemmed portion 56 having at least one pocket 74 (see FIG. 13). The method 300 further comprises step 304 of inserting at least one magnet 58 into at least one pocket 74 of each hemmed portion 56 (see FIG. 13). The method 300 further comprises step 306 of aligning the magnets 58 within the hemmed portions 56 in order to cause or create a magnetic attraction between adjacent magnets 58 and in order to automatically stack the hemmed portions 56 together, when the hemmed portions 56 overlap and when the magnetic curtain 50 is in the retracted position 28 (see FIG. 13). The method 300 further comprises step 308 of attaching to the curtain panel 53 a plurality of glider elements 76 for suspending the magnetic curtain 50 from a longitudinal curtain rail 64 (see FIGS. 12-13). Each glider element 76 has a first end 78 coupled to the curtain rail 64, and each glider element 76 has a second end 80 coupled to the hemmed portion 56 of each pleat 54 via an attachment element 84 (see FIG. 12). The attachment element 84 may comprise a snap 86. Alternatively, the attachment element 84 may comprise a hook and loop fastener (Velcro) (not shown), a hook (not shown), a clip (not shown), a clamp (not shown), a latch (not shown), or another suitable attachment element.

Figure 19:
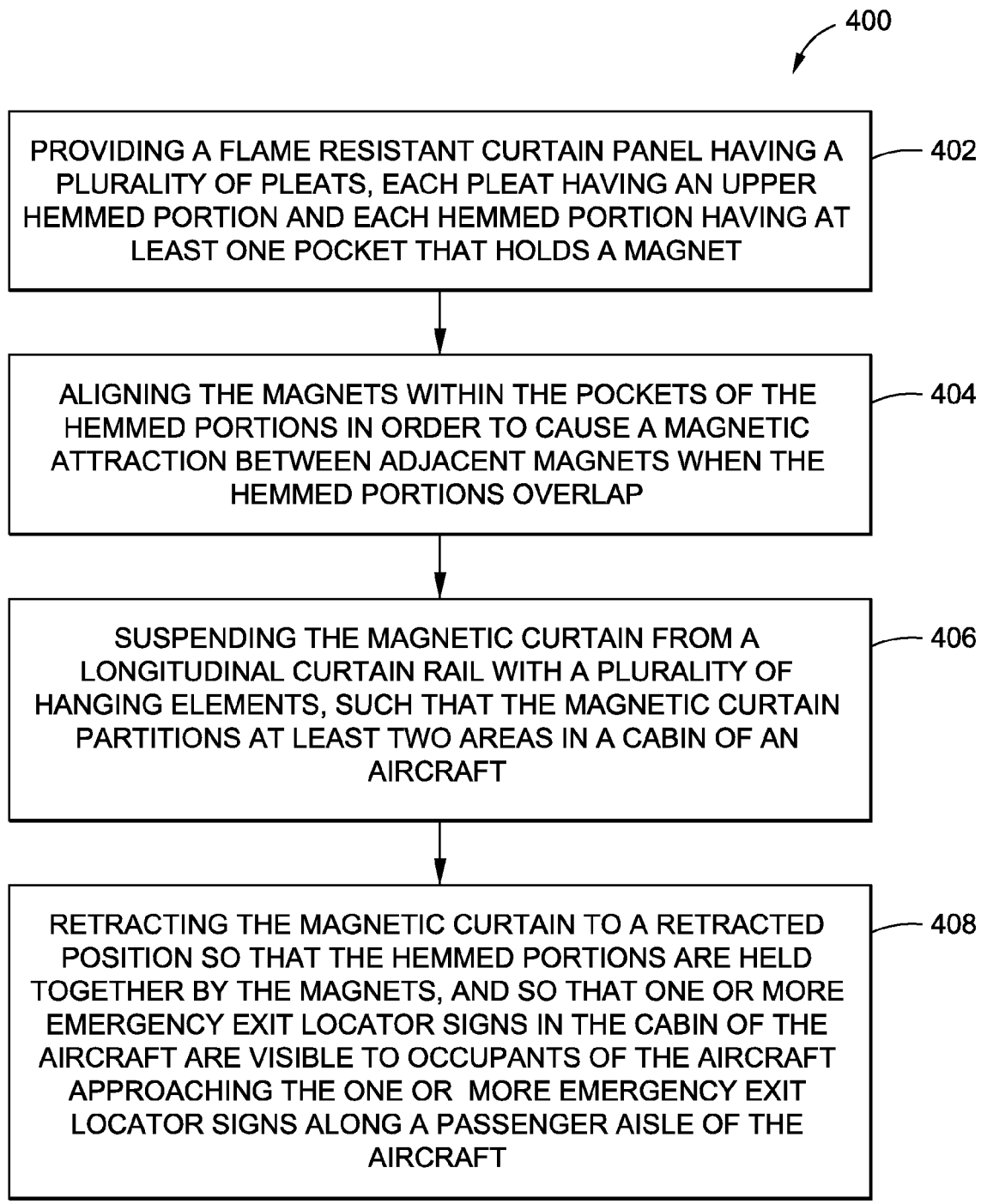

In another embodiment of the disclosure, there is provided a method 400 for facilitating visibility of one or more emergency exit locator signs 32 in a cabin 22 of an aircraft 10 (see FIG. 1). FIG. 19 is an illustration of a flow diagram of the method 400 of the disclosure. The method 400 comprises step 402 of providing a flame resistant curtain panel 53 having a plurality of pleats 54, each pleat 54 having a hemmed portion 56 in the upper portion 57 of the curtain panel 53, and each hemmed portion 56 having at least one pocket 74 that holds one or more magnets 58. The method 400 further comprises step 404 of aligning the magnets 58 within the pockets 74 of the hemmed portions 56 in order to cause or create a magnetic attraction between adjacent magnets 58 when the hemmed portions 56 overlap. The method 400 further comprises step 406 of suspending the magnetic curtain 50 from a longitudinal curtain rail 64 with a plurality of hanging elements 60, such that the magnetic curtain 50 partitions at least two cabin areas 24 (see FIG. 1) in the cabin 22 (see FIG. 1) of the aircraft 10 (see FIG. 1). The method 400 further comprises step 408 of retracting the magnetic curtain 50 to the retracted position 28, so that the hemmed portions 56 are held together by the magnets 58, and so that the one or more emergency exit locator signs 32 (see FIG. 1) in the cabin 22 (see FIG. 1) of the aircraft 10 (see FIG. 1) are visible to occupants 36 (see FIG. 1) of the aircraft 10 (see FIG. 1) approaching the one or more emergency exit locator signs 32 (see FIG. 1) along an aisle 34 (see FIG. 1) of the aircraft 10 (see FIG. 1).

One or more of the embodiments of the hanging partition and methods of the disclosure provides numerous advantages. The disclosed embodiments provide for a hanging partition, preferably in the form of a magnetic curtain, that allows for an automatic, hands-free stack-up of the magnetic curtain when the magnetic curtain is moved to a retracted position. When the magnetic curtain is neatly stacked up, the magnetic curtain hangs straight, and the magnetic curtain does not obstruct any emergency exit locator sign or signs in close proximity to the magnetic curtain, thus facilitating the visibility of the emergency exit locator sign or signs to occupants of a vehicle such as an aircraft. This can also reduce possible violations of FAR regulations involving emergency exit signs, such as 14 C.F.R. Section 25.811(d). The automatic, hands-free stack-up of the magnetic curtain also decreases the workload of the flight crew as they do not have to spend added time arranging the curtain so that the stack-up is neatly stacked. The automatic, hands-free stack-up of the magnetic curtain frees up the flight crew to be able to accomplish other tasks. Functionally, the magnetic curtain automatically closes when attempting to stow or retract when the aircraft takes off, lands, and taxis on the runway.

When the magnetic curtain needs to be expanded or opened, the magnets can easily release away each other to fully expand the magnetic curtain.

Figure 22B:
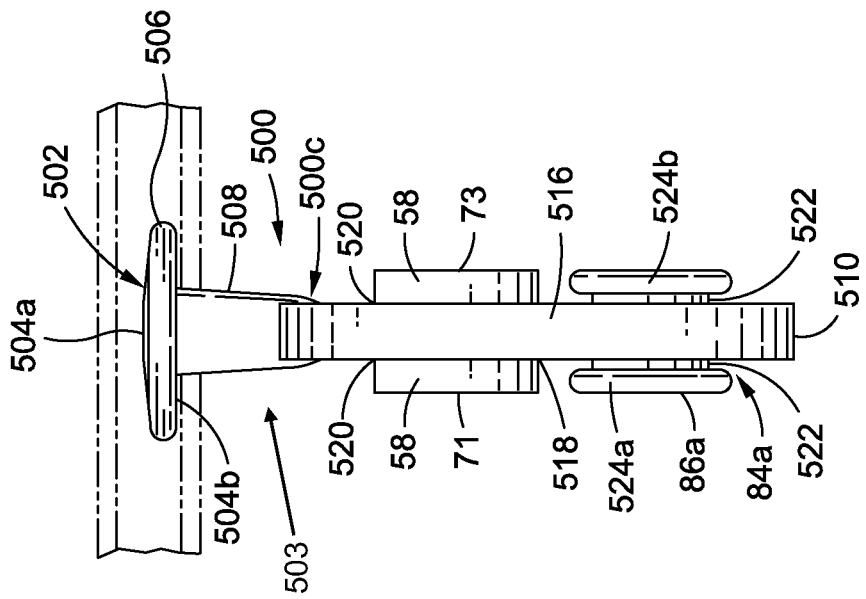
FIG. 22B is an illustration of a right side view of the integrated magnetic slider assembly of FIG. 22A.
Figure 22A:
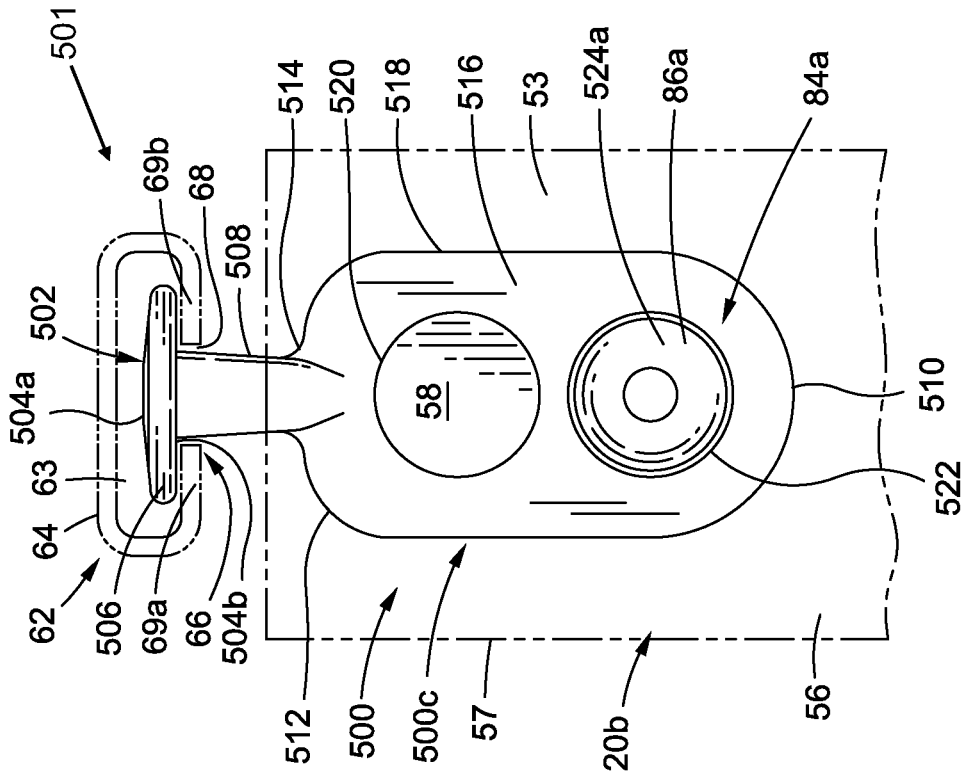
FIG. 22A is an illustration of a close-up plan view of a system having another embodiment of an integrated magnetic slider assembly of the disclosure.
Figure 23B:
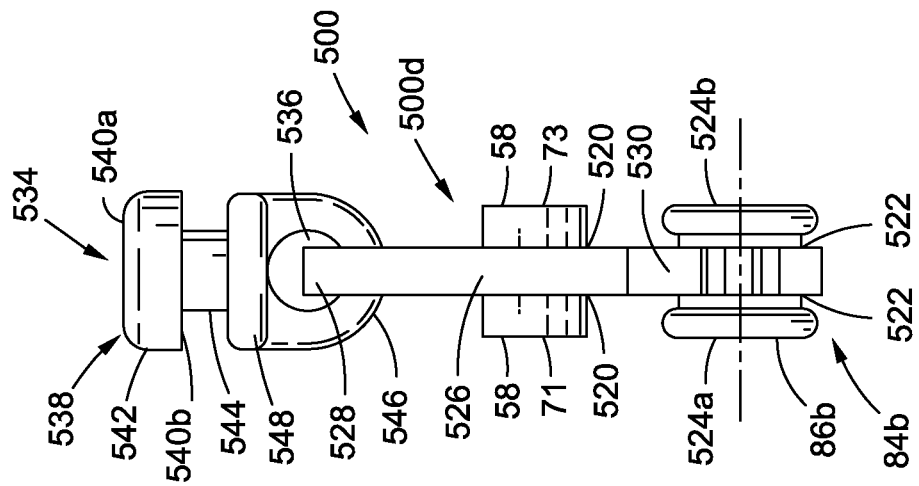
FIG. 23B is an illustration of a right side view of the integrated magnetic slider assembly of FIG. 23A.
Figure 23A:
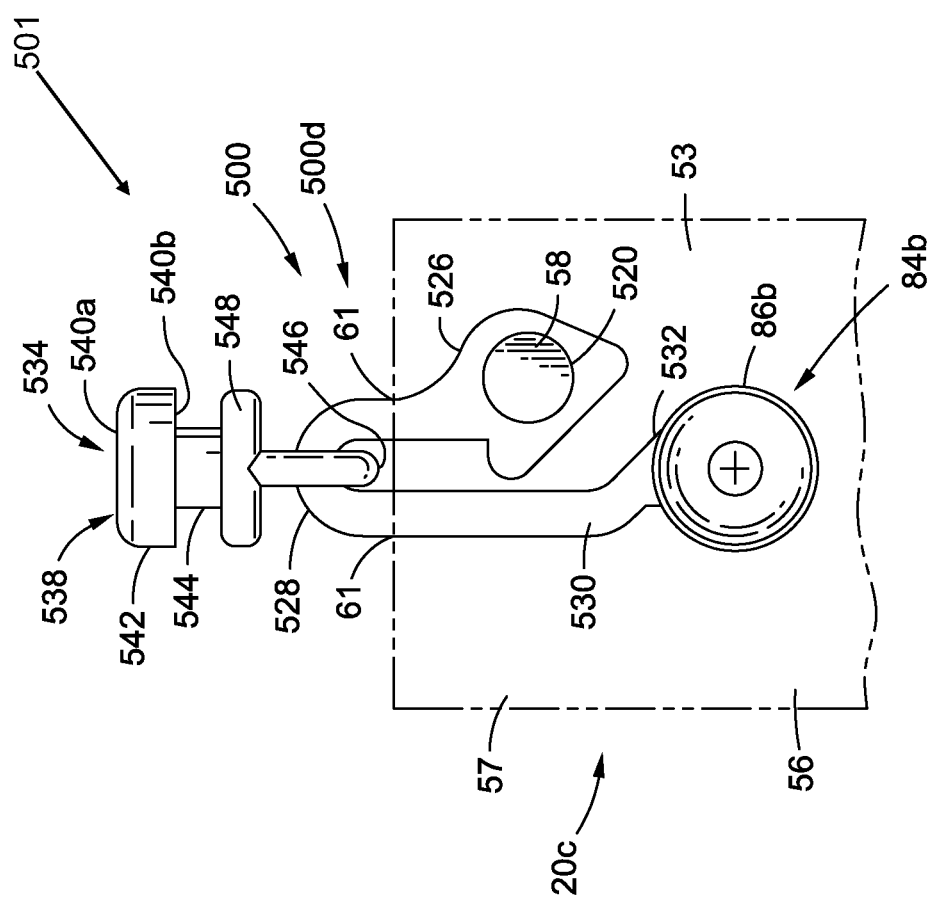
FIG. 23A is an illustration of a close-up plan view of a system having another embodiment of an integrated magnetic slider assembly of the disclosure.

In another embodiment of the disclosure, there is provided a system 501 (see FIG. 20A) for an integrated magnetic slider assembly 500 (see FIG. 20A), such as in the form of integrated magnetic slider assembly 500a (see FIG. 20A), for a hanging partition 20a (see FIG. 20A); a system 501 (see FIG. 22A) for an integrated magnetic slider assembly 500 (see FIG. 22A), such as in the form of integrated magnetic slider assembly 500c (see FIG. 22A), for a hanging partition 20b (see FIG. 22A); and a system 501 (see FIG. 23A) for an integrated magnetic slider assembly 500 (see FIG. 23A), such as in the form of integrated magnetic slider assembly 500d (see FIG. 23A), for a hanging partition 20c (see FIG. 23A).

Figure 20A:
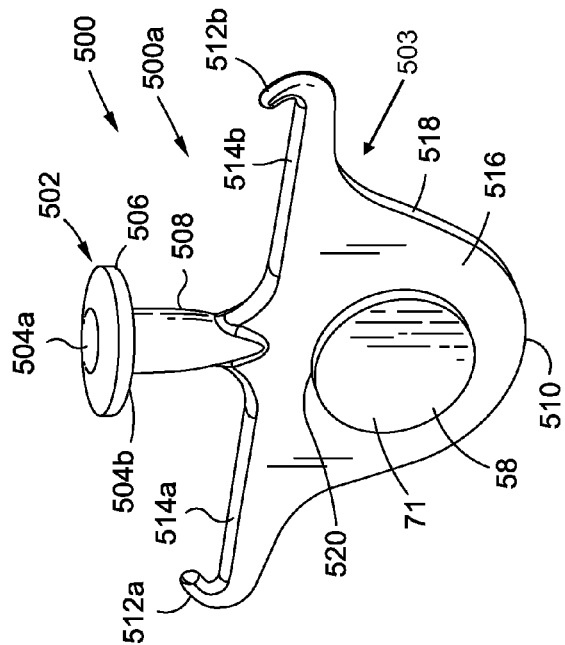
FIG. 20A is an illustration of a close-up plan view of a system having an embodiment of an integrated magnetic slider assembly of the disclosure.

FIG. 20A is an illustration of a close-up plan view of the system 501 having an embodiment of the integrated magnetic slider assembly 500, such as in the form of integrated magnetic slider assembly 500a, of the disclosure installed in the hanging partition 20a, such as in the form of a curtain panel 53. As shown in FIG. 20A, the system 501 comprises the integrated magnetic slider assembly 500, such as in the form of integrated magnetic slider assembly 500a, installed in the hanging partition 20a, and coupled to a longitudinal hanging device 62, such as in the form of curtain rail 64.

In an embodiment of the disclosure, there is provided an integrated magnetic slider assembly 500 (see FIGS. 20A, 21, 22A, 23A). The integrated magnetic slider assembly 500 (see FIGS. 20A, 21, 22A, 23A) comprises a slider portion 502 (see FIGS. 20A, 21, 22A) or slider portion 538 (see FIG. 23A) configured for suspension from a longitudinal hanging device 62 (see FIGS. 20A, 22A, 25, 26). The integrated magnetic slider assembly 500 (see FIGS. 20A, 21, 22A, 23A) further comprises a hanger portion 516 (see FIGS. 20A, 21, 22A) or a hanger portion 526 (see FIG. 23A) coupled to or integrated with the slider portion 502 (see FIGS. 20A, 21, 22A) or slider portion 538 (see FIG. 23A), respectively. The hanger portion 516 (see FIGS. 20A, 21, 22A) or the hanger portion 526 (see FIG. 23A) is configured for insertion within at least one hanging partition 20 (see FIG. 13), such as hanging partition 20a (see FIGS. 20A, 24), hanging partition 20b (see FIG. 22A), or hanging partition 20c (see FIG. 23A), having a plurality of pleats 54 (see FIG. 25).

The integrated magnetic slider assembly 500 (see FIGS. 20A, 21, 22A, 23A) further comprises one or more magnets 58 (see FIGS. 20A, 21, 22A, 23A) coupled to each of the hanger portions 516 (see FIG. 20A) and within the hanging partition 20a (see FIG. 20A), hanging partition 20b (see FIG. 22A), or hanging partition 20c (see FIG. 23A). When the integrated magnetic slider assembly 500 (see FIG. 25) is inserted within the at least one hanging partition 20a (see FIG. 25), all of the one or more magnets 58 (see FIG. 25) in the integrated magnetic slider assembly 500 (see FIG. 25) are vertically aligned with respect to each other to cause a magnetic attraction between adjacent magnets 58 (see FIG. 25) in order to hold the plurality of pleats 54 (see FIG. 25) together, when the at least one hanging partition 20a (see FIG. 25) is in a retracted position 28 (see FIG. 25).

In another embodiment, the hanger portion 516 (see FIG. 22A) further comprises an attachment element 84a (see FIG. 22A) comprising a snap fastener 86a (see FIG. 22A) coupled to one or more through openings 522 (see FIG. 22A) in the hanger portion 516 (see FIG. 22A). The hanger portion 516 (see FIG. 20A) may have one magnet 58 (see FIG. 20A) coupled to or within an opening 520 (see FIG. 20A).

Figure 20B:
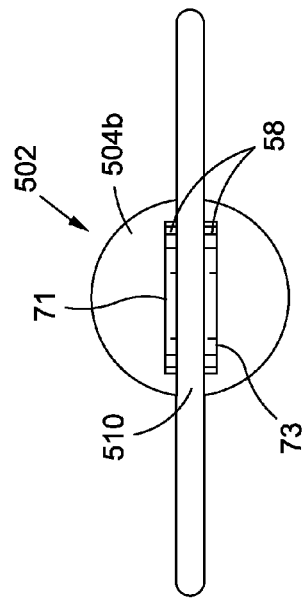
FIG. 20B is a perspective view of the integrated magnetic slider assembly of FIG. 20A.
Figure 21:
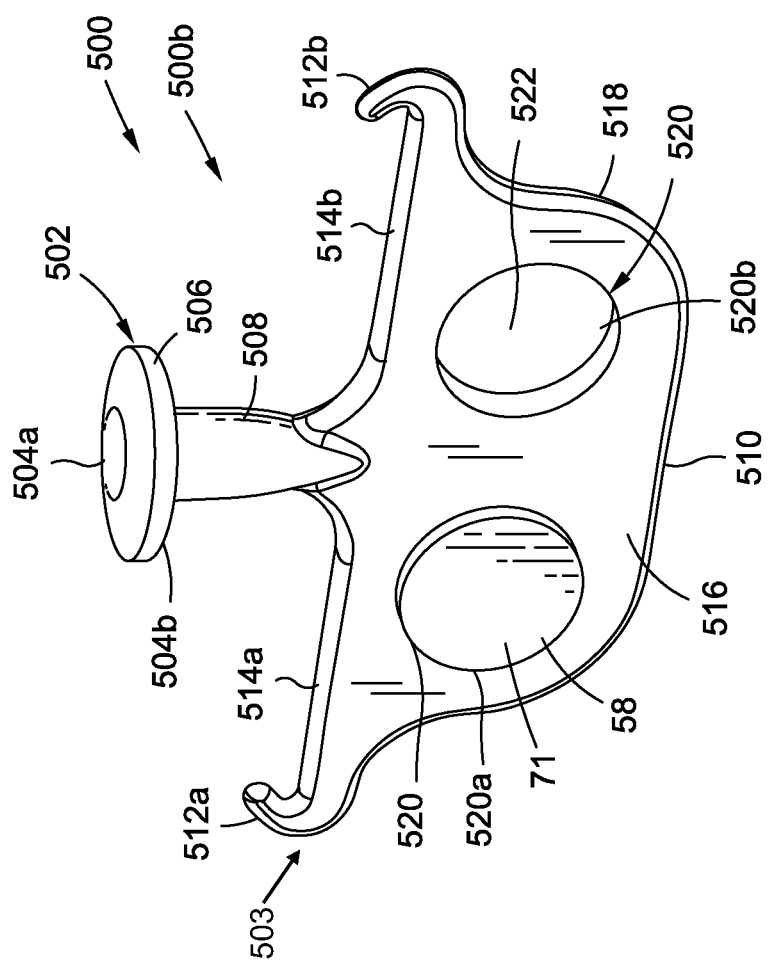
FIG. 21 is an illustration of a perspective view of another embodiment of an integrated magnetic slider assembly of the disclosure.

Alternatively, the hanger portion 516 (see FIG. 21) may have two openings 520 (see FIG. 21) housing two magnets 58 (see FIG. 21) in the hanger portion 516 (see FIG. 21). The one or more magnets 58 (see FIGS. 20A, 21, 22A, 23A) are preferably made of a material selected from the group consisting of an FAA approved magnetic material including neodymium, neodymium iron boron, hard ferromagnetic material, samarian cobalt, alnico, ceramic, ferrite, iron, nickel, and alloys of rare earth metals, or another suitable material. The slider portion 502 (see FIGS. 20B, 21, 22B) and the hanger portion 516 (see FIGS. 20B, 21, 22B) may comprise a monolithic or unitary configuration 503 (see FIGS. 20B, 21, 22B) or another suitable configuration. The slider portion 538 (see FIG. 23A) and the hanger portion 526 (see FIG. 23B) may comprise a two-piece configuration 534 (see FIG. 23A).

Figure 25:
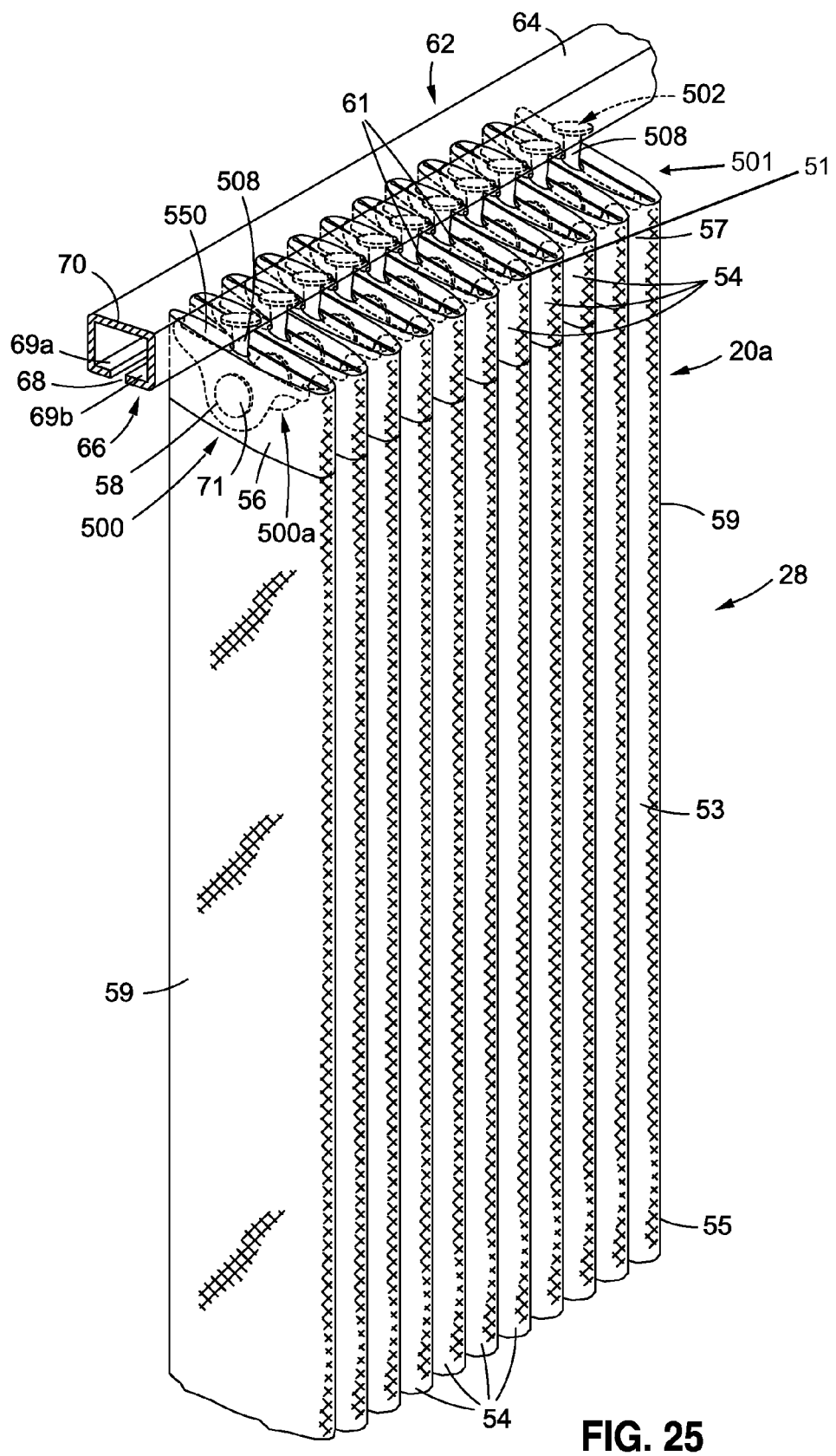
FIG. 25 is an illustration of a perspective view of a system with integrated magnetic slider assemblies of FIG. 20A, each in an installed position in a hanging partition that is in a retracted position.

In another embodiment of the disclosure, there is provided the system 501 (see FIGS. 20A, 25) for an integrated magnetic slider assembly 500 (see FIGS. 20A, 25). The system 501 (see FIGS. 20A, 25) comprises the integrated magnetic slider assembly 500 (see FIGS. 20A, 25), such as in the form of integrated magnetic slider assembly 500a (see FIGS. 20A, 25). The integrated magnetic slider assembly 500 (see FIG. 20A) comprises a slider portion 502 (see FIG. 20A), a hanger portion 516 (see FIG. 20A) coupled to or integrated with the slider portion 502 (see FIG. 20A), and one or more magnets 58 (see FIG. 20A) coupled to the hanger portion 516 (see FIG. 20A). As further shown in FIG. 20A, the integrated magnetic slider assembly 500, such as in the form of integrated magnetic slider assembly 500a, comprises a first end 506 and a second end 510.

In one embodiment, as shown in FIG. 20A, the hanger portion 516 may have one opening 520 for housing one or more magnets 58 in the hanger portion 520. Preferably, as shown in FIG. 20A, the hanger portion 516 may have one magnet 58 inserted in or coupled to the opening 520 in the hanger portion 516.

In another embodiment, as shown in FIG. 21, the hanger portion 516 may have two openings 520 for housing one or more magnets 58 in the hanger portion 520. Preferably, the hanger portion 516 (see FIG. 21) may have two magnets 58 (see FIG. 21), each magnet 58 (see FIG. 21) inserted in or coupled to each of the openings 520 (see FIG. 21) in the hanger portion 516 (see FIG. 21).

Preferably, the one or more magnets 58 (see FIGS. 20A, 21, 22A, 23A, 24, 25, 26) are made of a material selected from the group consisting of an FAA approved magnetic material including neodymium, neodymium iron boron, hard ferromagnetic material, samarian cobalt, alnico, ceramic, ferrite, iron, nickel, and alloys of rare earth metals. Preferably, the one or more magnets 58 (see FIGS. 20A, 21, 22A, 23A, 24, 25, 26) are made of neodymium, which material provides a protective coating to the one or more magnets 58. Preferably, the one or more magnets 58 (see FIGS. 20A, 21, 22A, 23A, 24, 25, 26) may have a thickness of about ¼ inch to about 1 inch, and more preferably, has a thickness of about ⅜ inch. However, the size, thickness and grade of the magnet used is preferably determined based on the thickness of the material used for the hanging partition 20a (see FIG. 20A).

The magnet 58 (see FIG. 20A) may be inserted into the opening 520 (see FIG. 20A), such as in the form of a through opening 522 (see FIG. 21), and the magnet 58 (see FIG. 20A) may be coupled to the hanger portion 516 (see FIG. 20A) via compression fitting, via an adhesive material, or via another suitable coupling mechanism. Alternatively, the opening 520 (see FIG. 20A) may be in the form of a recessed opening on each side of the hanger portion 516 (see FIG. 20A), and a magnet 58 (see FIG. 20A) may be inserted into each recessed opening on each side of the hanger portion 516 (see FIG. 20A), and each magnet 58 (see FIG. 20A) may be coupled to the hanger portion 516 (see FIG. 20A) via compression fitting, via an adhesive material, or via another suitable coupling mechanism.

As further shown in FIG. 20A, the slider portion 502 comprises a head portion 504a with a contact portion 504b. The slider portion 502 (see FIG. 20A) further comprises a neck portion 508 (see FIG. 20A) coupled to or integrated with the hanger portion 516 (see FIG. 20A).

The hanger portion 516 (see FIG. 20A) comprises a first lateral end portion 512a (see FIG. 20A), a second lateral end portion 512b (see FIG. 20A), a first shoulder portion 514a (see FIG. 20A), a second shoulder portion 514b (see FIG. 20A), a body portion 518 (see FIG. 20A), and an opening 520 (see FIG. 20A) through the body portion 518 (see FIG. 20A). The first lateral end portion 512a (see FIG. 20A) and the second lateral end portion 512b (see FIG. 20A) aid in keeping or maintaining the plurality of pleats 54 (see FIGS. 25, 26) straight or substantially straight.

In another embodiment, as shown in FIG. 22A, and discussed in further detail below, the hanger portion 516 comprises an attachment element 84a, such as, for example, a snap fastener 86a. The snap fastener 86a (see FIG. 22A) is preferably coupled to one or more through openings 522 (see FIG. 22A) formed in the hanger portion 516 (see FIG. 22A).

As shown in FIG. 20A and FIG. 25, the system 501 further comprises at least one hanging partition 20 (see FIG. 13), such as hanging partition 20a configured for coupling to the hanger portion 516 of the integrated magnetic slider assembly 500, where the at least one hanging partition 20a has a plurality of pleats 54 (see FIG. 25). Each of the plurality of pleats 54 (see FIG. 26) may have a hemmed portion 56 (see FIG. 26) with one or more openings 61 (see FIG. 26) at an upper portion 57 (see FIG. 26) of the at least one hanging partition 20a (see FIG. 26). The hanger portion 516 (see FIG. 20A) of the integrated magnetic slider assembly 500 (see FIGS. 20A, 26) is preferably positioned within each of two or more hemmed portions 56 (see FIG. 26).

All the magnets 58 (see FIG. 25) in the integrated magnetic slider assembly 500 (see FIG. 25) are preferably vertically aligned with respect to each other to cause a magnetic attraction between adjacent magnets 58 (see FIG. 25) in order to hold the plurality of pleats 54 (see FIG. 25) together, when the at least one hanging partition 20a (see FIG. 25) is in a retracted position 28 (see FIG. 25). Preferably, all of the magnets 58 (see FIG. 25) are laterally stacked within and across the upper portion 57 (see FIG. 25) of the hanging partition 20a (see FIG. 25), when the hanging partition 20a (see FIG. 25) is in the retracted position 28 (see FIG. 25).

Figure 28:
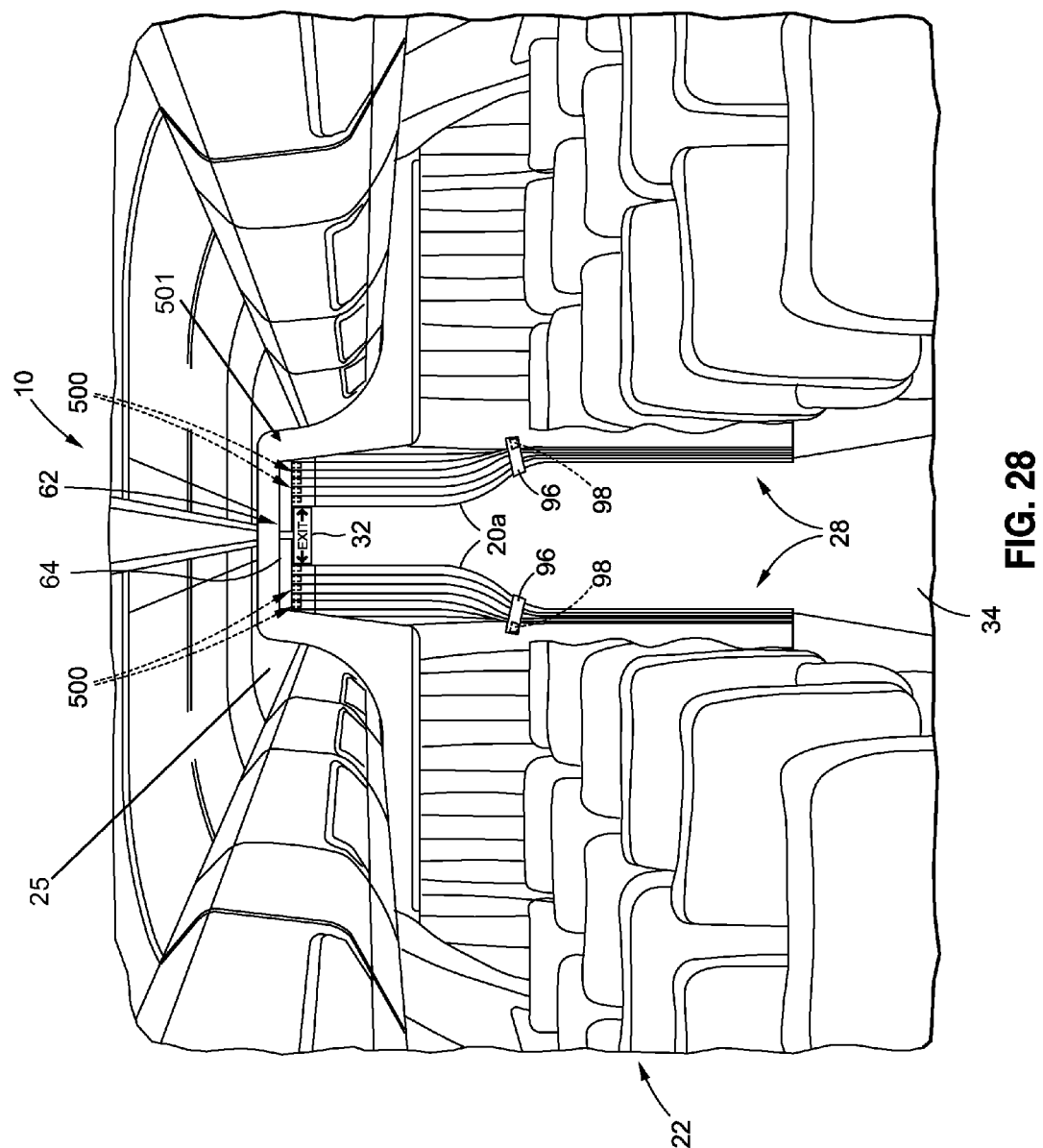
FIG. 28 is an illustration of a perspective view of a system having integrated magnetic slider assemblies for hanging partitions, where the hanging partitions are in a retracted position and have magnetic tie-backs; and, FIG. 29 is an illustration of a flow diagram of an embodiment of another method of the disclosure.

The at least one hanging partition 20a (see FIGS. 20A, 25, 28) preferably partitions at least two cabin areas 24 (see FIG. 1) in a cabin 22 (see FIGS. 1, 28) of an aircraft 10 (see FIG. 28). When the at least one hanging partition 20a (see FIGS. 25, 28) is in a retracted position 28 (see FIGS. 25, 28), the at least one hanging partition 20a (see FIGS. 25, 28) does not obstruct an emergency exit locator sign 32 (see FIG. 28) in proximity to the at least one hanging partition 20a (see FIG. 28) in the aircraft 10 (see FIG. 28).

Figure 26:
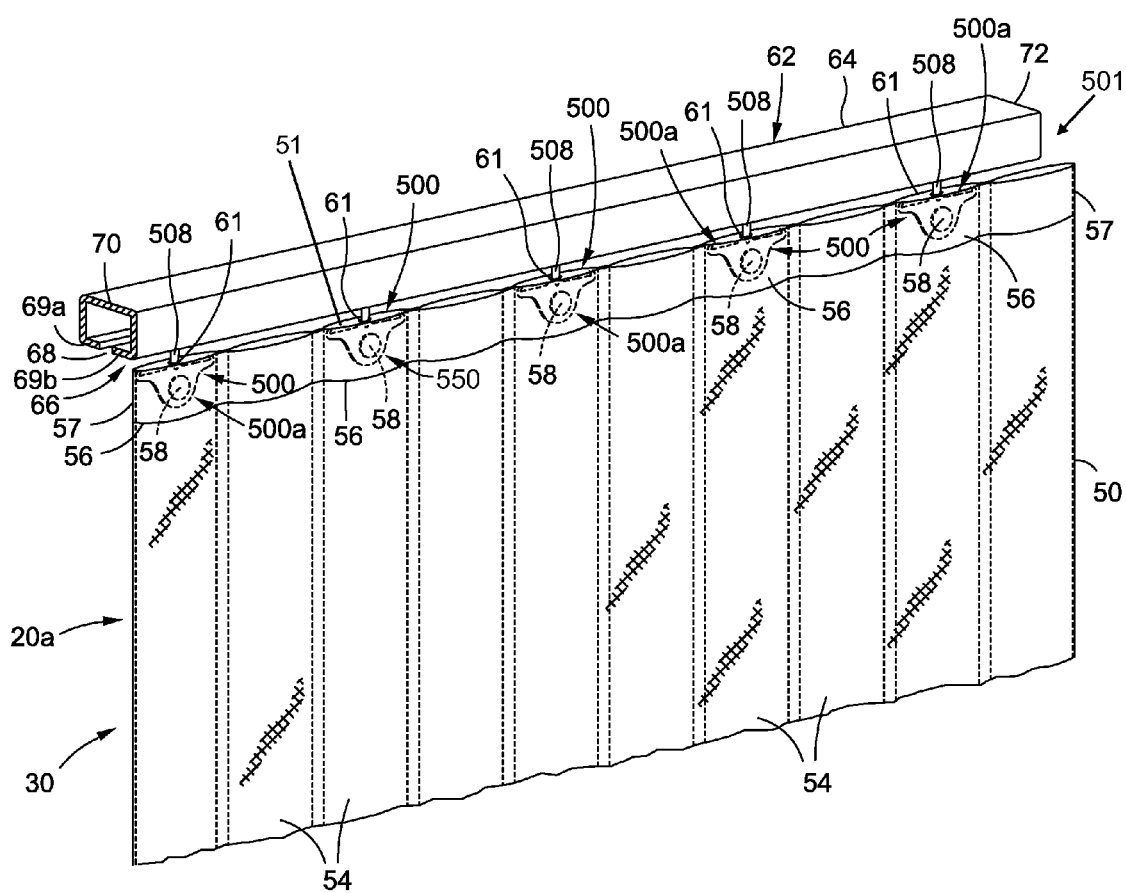
FIG. 26 is an illustration of a close-up perspective view of a system with integrated magnetic slider assemblies of FIG. 20A, each in an installed position in a hanging partition that is in an extended position.

As shown in FIG. 25, the hanging partition 20a comprises at least one curtain panel 52 having a plurality of pleats 54. Each pleat 54 (see FIG. 25) has a hemmed portion 56 (see FIG. 25). As shown in FIG. 25, the hanging partition 20a has a lower portion 55, an upper portion 57, and side portions 59. Preferably, the hemmed portions 56 (see FIG. 25) are positioned along a top end 51 (see FIG. 25) of the upper portion 57 (see FIG. 25) of the hanging panel 52 (see FIG. 25). The one or more magnets 58 (see FIG. 25) are preferably positioned in the integrated magnetic slider assembly 500 (see FIG. 25) within two or more of the hemmed portions 56 (see FIG. 25) and preferably only positioned at the top end of the upper portion 57 (see FIG. 25) of the hanging panel 52 (see FIG. 25). Preferably, each hemmed portion 56 (see FIG. 25) holds one or more magnets 58 (see FIG. 25) in the integrated magnetic slider assembly 500 (see FIG. 25). However, as shown in FIG. 26, the magnets 58 may be positioned in alternating hemmed portions 56 of the pleats 54 or in randomly selected hemmed portions 56 of the pleats 54, depending on the strength of attraction between adjacent or succeeding magnets 58, and depending on the weight and thickness of the material or fabric used for the hanging partition 20a. Whether the magnets 58 (see FIGS. 25, 26) are in every pleat or every other pleat or in random pleats depends on the strength of attraction between the adjacent or succeeding magnets 58 (see FIGS. 25, 26) based on the variation of thickness and fabric of the hanging partition 20a (see FIGS. 25, 26). Preferably, the magnets 58 (see FIG. 25) are laterally stacked within and across only the upper portion 57 (see FIG. 25) when the hanging partition 20a (see FIG. 25) is in the retracted position 28 (see FIG. 25).

It is desirable to use magnets 58 (see FIGS. 25, 26) in the hanging partition 20a (see FIGS. 25, 26) having a magnetic field that does not interfere with any electrical or electronic systems on the aircraft 10 (see FIGS. 1, 28). The number of magnets 58 (see FIGS. 25, 26) needed preferably equals the distance necessary for the maximum attraction between adjacent or succeeding magnets 58 in succession in the hemmed portions 56 of the plurality of pleats 54 (see FIGS. 25, 26). As shown in FIGS. 25, 26, the magnets 58 in the integrated magnetic slider assembly 500 are preferably hidden in the hemmed portions 56 of the plurality of pleats 54 of the hanging partition 20a to maintain an aesthetically pleasing visual look to the hanging partition 20.

As shown in FIG. 20A and FIG. 25, the system 501 further comprises a longitudinal hanging device 62 configured for coupling to and suspending the slider portion 502 of the integrated magnetic slider assembly 500. As shown in FIG. 20A and FIG. 25, the slider portion 502 is preferably coupled to the longitudinal hanging device 62, such as in the form of curtain rail 64.

As further shown in FIG. 20A and FIG. 25, the longitudinal hanging device 62, such as in the form of curtain rail 64, preferably has a square shaped configuration 66 with a gap 68, a first track 69a, a second track 69b, and a spaced area 63. When the integrated magnetic slider assembly 500 (see FIGS. 20A, 25), such as in the form of integrated magnetic slider assembly 500a (see FIGS. 20A, 25), is coupled to the longitudinal hanging device 62 (see FIGS. 20A, 25), the neck portion 508 (see FIGS. 20A, 25) of the slider portion 502 (see FIGS. 20A, 25) is preferably configured to fit in the gap 68 (see FIGS. 20A, 25) of the longitudinal hanging device 62 (see FIGS. 20A, 25), and the contact portions 504b (see FIG. 20A) of the head portion 504a (see FIG. 20A) are preferably configured to contact the first track 69a (see FIGS. 20A, 25) and the second track 69b (see FIGS. 20A, 25), respectively, of the longitudinal hanging device 62 (see FIGS. 20A, 25).

Preferably, the slider portion 502 (see FIG. 20A) and the hanger portion 516 (see FIG. 20A) of the integrated magnetic slider assembly 500 (see FIG. 20A), such as in the form of integrated magnetic slider assembly 500a (see FIG. 20A), comprise a monolithic or unitary configuration 503 (see FIG. 20B) that is continuous. However, the slider portion 502 (see FIG. 20A) and the hanger portion 516 (see FIG. 20A) may also comprise a two-piece configuration 538 (see FIG. 23A) or another suitable configuration. Preferably, the slider portion 502 (see FIG. 20A) and the hanger portion 516 (see FIG. 20A) are made of a rigid plastic material, such as nylon, for example, nylon 6/6 (polyhexamethylene adiptimide); or a metal material such as steel, stainless steel, aluminum, or another suitable metal material; or wood; or another suitable natural or man-made substantially rigid material. Preferably, the slider portion 502 (see FIG. 20A) and the hanger portion 516 (see FIG. 20A) of the integrated magnetic slider assembly 500 (see FIG. 20A), such as in the form of integrated magnetic slider assembly 500a (see FIG. 20A), are formed of a material having a tensile strength greater than the tear strength of the hanging partition 20a (see FIG. 20A).

The longitudinal hanging device 62 (see FIG. 20A), such as in the form of curtain rail 64 (see FIG. 20A), may be made of a metal material such as steel, stainless steel, aluminum, or another suitable metal material; or a rigid plastic material, such as nylon, for example, nylon 6/6 (polyhexamethylene adiptimide); or another suitable natural or man-made substantially rigid material. Preferably, if the slider portion 502 (see FIG. 20A) and the hanger portion 516 (see FIG. 20A) are made of nylon, for example, nylon 6/6 (polyhexamethylene adiptimide), the longitudinal hanging device 62 (see FIG. 20A), such as in the form of curtain rail 64 (see FIG. 20A), is made of a metal material, and preferably, if the slider portion 502 (see FIG. 20A) and the hanger portion 516 (see FIG. 20A) are made of a metal material, the longitudinal hanging device 62 (see FIG. 20A), such as in the form of curtain rail 64 (see FIG. 20A), is made of nylon, for example, nylon 6/6 (polyhexamethylene adiptimide).

As further shown in FIG. 20A, the hanging partition 20a, such as in the form of a curtain panel 53 has an upper portion 57 with a hemmed portion 56, and at the top end 51 (see FIGS. 25, 26) of the upper portion 57 is an opening 61. When the integrated magnetic slider assembly 500 (see FIG. 20A), such as in the form of integrated magnetic slider assembly 500a (see FIG. 20A), is installed in the hanging partition 20a (see FIG. 20A), the neck portion 508 (see FIG. 20A) is inserted through the opening 61 (see FIG. 20A) at the top end 51 (see FIGS. 25, 26) of the upper portion 57 (see FIG. 20A) of the hemmed portion 56 (see FIG. 20A) of the hanging partition 20a (see FIG. 20A), and the first lateral end portion 512a (see FIG. 20A) and the second lateral end portion 512b (see FIG. 20A) aid in securing the hanger portion 516 in place within the upper portion 57 (see FIG. 20A) of the hanging partition 20a (see FIG. 20A).

FIG. 20B is a perspective view of the integrated magnetic slider assembly 500, such as in the form of integrated magnetic slider assembly 500a, of FIG. 20A. As shown in FIG. 20B, the integrated magnetic slider assembly 500, such as in the form of integrated magnetic slider assembly 500a, comprises the first end 506, the second end 510, and the slider portion 502 coupled to or integrated with the hanger portion 516. As further shown in FIG. 20B, the slider portion 502 comprises the head portion 504a with the contact portion 504b, and the neck portion 508 coupled to or integrated with the hanger portion 516.

As further shown in FIG. 20B, the hanger portion 516 comprises the first lateral end portion 512a, the second lateral end portion 512b, the first shoulder portion 514a, the second shoulder portion 514b, the body portion 518, and the opening 520 through the body portion 518. The magnet 58 may be inserted into the opening 520 (see FIG. 20A) and coupled to the hanger portion 516 (see FIG. 20A) via compression fitting, via an adhesive material, or via another suitable coupling mechanism. As further shown in FIG. 20B, the north pole surface 71 of the magnet 58 is visible.

Figure 20C:
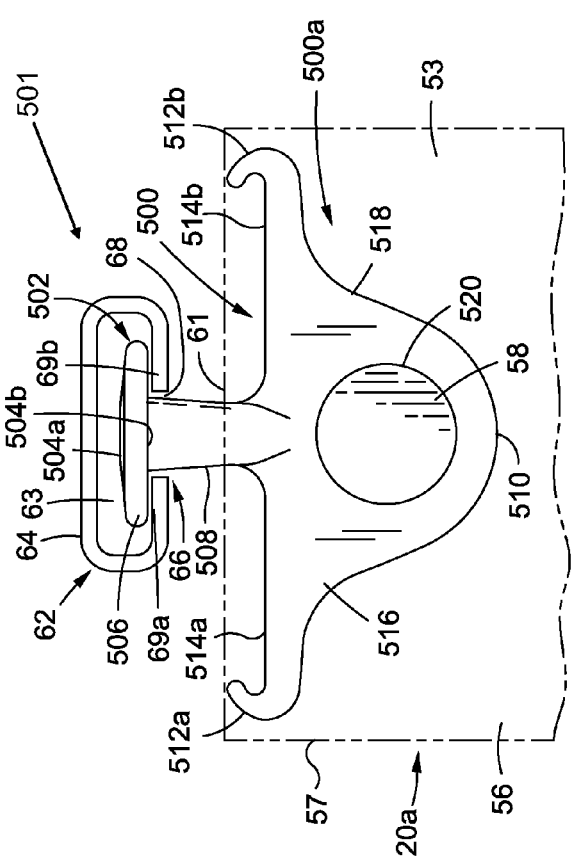
FIG. 20C is a top view of the integrated magnetic slider assembly of FIG. 20B.

FIG. 20C is a top view of the integrated magnetic slider assembly 500, such as in the form of integrated magnetic slider assembly 500a, of FIG. 20B. FIG. 20C shows the head portion 504a of the slider portion 502, the first lateral end portion 512a, the second lateral end portion 512b, the first shoulder portion 514a, and the second shoulder portion 514b.

Figure 20D:
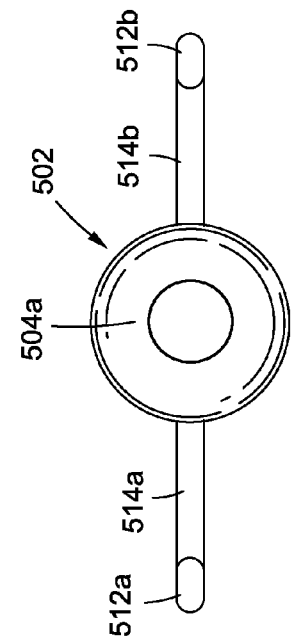
FIG. 20D is a bottom view of the integrated magnetic slider assembly of FIG. 20B.

FIG. 20D is a bottom view of the integrated magnetic slider assembly 500, such as in the form of integrated magnetic slider assembly 500a, of FIG. 20B. FIG. 20D shows the contact portion 504b of the slider portion 502, the second end 510, and the magnet 58 with the north pole surface 71 and the south pole surface 73.

FIG. 21 is an illustration of a perspective view of another embodiment of an integrated magnetic slider assembly 500, such as in the form of integrated magnetic slider assembly 500b, having two openings 520 for the magnets 58, including first opening 520a and second opening 520b. As shown in FIG. 21, a magnet 58 with the north pole surface 71 visible may be inserted in the first opening 520a. Alternatively, the magnet 58 may be inserted in the second opening 520b only, or in addition to the magnet 58 in the first opening 520a, a second magnet 58 may also be inserted in the second opening 520b. The magnet 58 (see FIG. 21) may be inserted into the opening 520 (see FIG. 21) and coupled to the hanger portion 516 (see FIG. 21) via compression fitting, via an adhesive material, or via another suitable coupling mechanism.

As shown in FIG. 21, the opening 520, such as second opening 520b, is preferably in the form of a through opening 522. The opening 520 (see FIG. 21), such as first opening 520a (see FIG. 21), is also preferably in the form of a through opening 522 (see FIG. 21). Alternatively, the opening 520 (see FIG. 21) may be in the form of a recessed opening on each side of the hanger portion 516 (see FIG. 21), and a magnet 58 (see FIG. 21) may be inserted into each recessed opening on each side of the hanger portion 516 (see FIG. 21), and each magnet 58 (see FIG. 21) may be coupled to the hanger portion 516 (see FIG. 21) via compression fitting, via an adhesive material, or via another suitable coupling mechanism.

The magnet 58 (see FIG. 21) is preferably made of an FAA approved magnetic material comprising neodymium, neodymium iron boron, hard ferromagnetic material, samarium cobalt, alnico, ceramic, ferrite, iron, nickel, alloys of rare earth metals, or another suitable FAA approved magnetic material.

As further shown in FIG. 21, the integrated magnetic slider assembly 500, such as in the form of integrated magnetic slider assembly 500b, comprises a first end 506, a second end 510, and a slider portion 502 coupled to or integrated with a hanger portion 516.

Preferably, the slider portion 502 (see FIG. 21) and the hanger portion 516 (see FIG. 21) of the integrated magnetic slider assembly 500 (see FIG. 21), such as in the form of integrated magnetic slider assembly 500b (see FIG. 21), comprise a monolithic or unitary configuration 503 (see FIG. 21) that is continuous. However, the slider portion 502 (see FIG. 21) and the hanger portion 516 (see FIG. 21) may also comprise a two-piece configuration 534 (see FIG. 23A)

or another suitable configuration. Preferably, the slider portion 502 (see FIG. 21) and the hanger portion 516 (see FIG. 21) are made of a rigid plastic material, such as nylon, for example, nylon 6/6 (polyhexamethylene adiptimide); or a metal material such as steel, stainless steel, aluminum, or another suitable metal material; or wood; or another suitable natural or man-made substantially rigid material. Preferably, the slider portion 502 (see FIG. 21) and the hanger portion 516 (see FIG. 21) of the integrated magnetic slider assembly 500 (see FIG. 21), such as in the form of integrated magnetic slider assembly 500b (see FIG. 21), are formed of a material having a tensile strength greater than the tear strength of the hanging partition 20a (see FIG. 20A).

The longitudinal hanging device 62 (see FIG. 20A), such as in the form of curtain rail 64 (see FIG. 20A), may be made of a metal material such as steel, stainless steel, aluminum, or another suitable metal material; or a rigid plastic material, such as nylon, for example, nylon 6/6 (polyhexamethylene adiptimide); or another suitable natural or man-made substantially rigid material. Preferably, if the slider portion 502 (see FIG. 21) and the hanger portion 516 (see FIG. 21) are made of nylon, for example, nylon 6/6 (polyhexamethylene adiptimide), the longitudinal hanging device 62 (see FIG. 20A), such as in the form of curtain rail 64 (see FIG. 20A), is made of a metal material, and preferably, if the slider portion 502 (see FIG. 21) and the hanger portion 516 (see FIG. 21) are made of a metal material, the longitudinal hanging device 62 (see FIG. 20A), such as in the form of curtain rail 64 (see FIG. 20A), is made of nylon, for example, nylon 6/6 (polyhexamethylene adiptimide).

The slider portion 502 (see FIG. 21) comprises a head portion 504a (see FIG. 21) with a contact portion 504b (see FIG. 21). The slider portion 502 (see FIG. 21) further comprises a neck portion 508 (see FIG. 21) coupled to or integrated with the hanger portion 516 (see FIG. 21).

In addition to the first opening 520a and the second opening 520b, the hanger portion 516 (see FIG. 21) also comprises a first lateral end portion 512a (see FIG. 21), a second lateral end portion 512b (see FIG. 21), a first shoulder portion 514a (see FIG. 21), a second shoulder portion 514b (see FIG. 21), and a body portion 518 (see FIG. 21).

Similar to the integrated magnetic slider assembly 500, such as in the form of integrated magnetic slider assembly 500a, of FIG. 20A, the integrated magnetic slider assembly 500, such as in the form of integrated magnetic slider assembly 500b, may be incorporated in a system 501. When the integrated magnetic slider assembly 500, such as in the form of integrated magnetic slider assembly 500b, is part of the system 501, the slider portion 502 (see FIG. 21) is preferably coupled to the longitudinal hanging device 62 (see FIG. 20A), such as in the form of curtain rail 64 (see FIG. 20A), and the hanger portion 516 (see FIG. 21) is installed or inserted in the hanging partition 20a (see FIG. 20A), such as in the form of a curtain panel 53 (see FIG. 20A).

FIG. 22A is an illustration of a close-up plan view of a system 501 having another embodiment of an integrated magnetic slider assembly 500, such as in the form of integrated magnetic slider assembly 500c, of the disclosure installed in a hanging partition 20b. As shown in FIG. 22A, the system 501 comprises the integrated magnetic slider assembly 500, such as in the form of integrated magnetic slider assembly 500c, installed in the hanging partition 20b, and attached to longitudinal hanging device 62, such as in the form of curtain rail 64.

As further shown in FIG. 22A, the integrated magnetic slider assembly 500, such as in the form of integrated magnetic slider assembly 500c, comprises a first end 506 and a second end 510. As further shown in FIG. 22A, the integrated magnetic slider assembly 500, such as in the form of integrated magnetic slider assembly 500c, comprises a slider portion 502 coupled to or integrated with a hanger portion 516.

Preferably, the slider portion 502 (see FIG. 22A) and the hanger portion 516 (see FIG. 22A) of the integrated magnetic slider assembly 500 (see FIG. 22A), such as in the form of integrated magnetic slider assembly 500c (see FIG. 22A), comprise a monolithic or unitary configuration 503 (see FIG. 22A) that is continuous. However, the slider portion 502 (see FIG. 22A) and the hanger portion 516 (see FIG. 22A) may also comprise a two-piece configuration 534 (see FIG. 23A) or another suitable configuration. Preferably, the slider portion 502 (see FIG. 22A) and the hanger portion 516 (see FIG. 22A) are made of a rigid plastic material, such as nylon, for example, nylon 6/6 (polyhexamethylene adiptimide); or a metal material such as steel, stainless steel, aluminum, or another suitable metal material; or wood; or another suitable natural or man-made substantially rigid material. Preferably, the slider portion 502 (see FIG. 22A) and the hanger portion 516 (see FIG. 22A) of the integrated magnetic slider assembly 500 (see FIG. 22A), such as in the form of integrated magnetic slider assembly 500c (see FIG. 22A), are formed of a material having a tensile strength greater than the tear strength of the hanging partition 20b (see FIG. 22A).

The longitudinal hanging device 62 (see FIG. 22A), such as in the form of curtain rail 64 (see FIG. 22A), may be made of a metal material such as steel, stainless steel, aluminum, or another suitable metal material; or a rigid plastic material, such as nylon, for example, nylon 6/6 (polyhexamethylene adiptimide); or another suitable natural or man-made substantially rigid material. Preferably, if the slider portion 502 (see FIG. 22A) and the hanger portion 516 (see FIG. 22A) are made of nylon, for example, nylon 6/6 (polyhexamethylene adiptimide), the longitudinal hanging device 62 (see FIG. 22A), such as in the form of curtain rail 64 (see FIG. 22A), is made of a metal material, and preferably, if the slider portion 502 (see FIG. 22A) and the hanger portion 516 (see FIG. 22A) are made of a metal material, the longitudinal hanging device 62 (see FIG. 22A), such as in the form of curtain rail 64 (see FIG. 22A), is made of nylon, for example, nylon 6/6 (polyhexamethylene adiptimide).

The slider portion 502 (see FIG. 22A) comprises a head portion 504a (see FIG. 22A) with a contact portion 504b (see FIG. 22A). The slider portion 502 (see FIG. 22A) further comprises a neck portion 508 (see FIG. 22A) coupled to or integrated with the hanger portion 516 (see FIG. 22A).

The hanger portion 516 (see FIG. 22A) comprises a lateral end portion 512 (see FIG. 22A), a shoulder portion 514 (see FIG. 22A), a body portion 518 (see FIG. 22A), and an opening 520 (see FIG. 22A) through the body portion 518 (see FIG. 22A). A magnet 58 (see FIG. 22A) may be inserted into the opening 520 (see FIG. 22A), such as in the form of a through opening 522 (see FIG. 21), and the magnet 58 (see FIG. 22A) may be coupled to the hanger portion 516 (see FIG. 22A) via compression fitting, via an adhesive material, or via another suitable coupling mechanism. Alternatively, the opening 520 (see FIG. 22A) may be in the form of a recessed opening on each side of the hanger portion 516 (see FIG. 22A), and a magnet 58 (see FIG. 22A) may be inserted into each recessed opening on each side of the hanger portion 516 (see FIG. 22A), and each magnet 58 (see FIG.

22A) may be coupled to the hanger portion 516 (see FIG. 22A) via compression fitting, via an adhesive material, or via another suitable coupling mechanism.

The magnet 58 (see FIG. 22A) is preferably made of an FAA approved magnetic material comprising neodymium, neodymium iron boron, hard ferromagnetic material, samarium cobalt, alnico, ceramic, ferrite, iron, nickel, alloys of rare earth metals, or another suitable FAA approved magnetic material.

As further shown in FIG. 22A, the hanger portion 516 may comprise an attachment element 84a, such as in the form of a snap fastener 86a, inserted through or coupled in a through opening 522. The attachment element 84a (see FIG. 22A), such as in the form of snap fastener 86a (see FIG. 22A), comprises a first side 524a (see FIG. 22A) and a second side 524b (see FIG. 22B). The attachment element 84a (see FIG. 22A), such as in the form of a snap fastener 86a (see FIG. 22A), may preferably be used to facilitate attachment of the hanging partition 20b (see FIG. 22A) to the hanger portion 516 (see FIG. 22A) of the integrated magnetic slider assembly 500 (see FIG. 22A), such as in the form of integrated magnetic slider assembly 500c (see FIG. 22A). Although the attachment element 84a (see FIG. 22A) may comprise a snap fastener 86a (see FIG. 22A), the attachment element 84a (see FIG. 22A) may also comprise a hook and loop fastener (Velcro) (not shown), a hook (not shown), a clip (not shown), a clamp (not shown), a latch (not shown), or another suitable attachment element.

As further shown in FIG. 22A, the slider portion 502 is preferably coupled to the longitudinal hanging device 62, such as in the form of curtain rail 64. As shown in FIG. 22A, the longitudinal hanging device 62, such as in the form of curtain rail 64, preferably has a square shaped configuration 66 with a gap 68, a first track 69a, a second track 69b, and a spaced area 63. When the integrated magnetic slider assembly 500 (see FIG. 22A), such as in the form of integrated magnetic slider assembly 500c (see FIG. 22A), is coupled to the longitudinal hanging device 62 (see FIG. 22A), the neck portion 508 (see FIG. 22A) of the slider portion 502 (see FIG. 22A) is preferably configured to fit in the gap 68 (see FIG. 22A) of the longitudinal hanging device 62 (see FIG. 22A), and the contact portions 504b (see FIG. 22A) of the head portion 504a (see FIG. 22A) are preferably configured to contact the first track 69a (see FIG. 22A) and the second track 69b (see FIG. 22A), respectively, of the longitudinal hanging device 62 (see FIG. 22A).

As further shown in FIG. 22A, the hanging partition 20c, such as in the form of a curtain panel 53 has an upper portion 57 with a hemmed portion 56, and at the top end 51 (see FIGS. 25, 26) of the upper portion 57 is an opening 61 (see FIG. 20A). When the integrated magnetic slider assembly 500 (see FIG. 22A), such as in the form of integrated magnetic slider assembly 500c (see FIG. 22A), is installed in the hanging partition 20b (see FIG. 22A), the neck portion 508 (see FIG. 22A) is inserted through the opening 61 (see FIG. 20A) at the top end 51 (see FIGS. 25, 26) of the upper portion 57 (see FIG. 22A) of the hemmed portion 56 (see FIG. 22A) of the hanging partition 20b (see FIG. 22A), and the attachment element 84a (see FIG. 22A), such as in the form of a snap fastener 86a (see FIG. 22A), aids in securing the hanging partition 20b (see FIG. 22A) to the hanger portion 516 within the upper portion 57 (see FIG. 20A) of the hanging partition 20a (see FIG. 20A).

FIG. 22B is an illustration of a right side view of the integrated magnetic slider assembly 500, such as in the form of integrated magnetic slider assembly 500c, of FIG. 22A. As shown in FIG. 22B, the integrated magnetic slider assembly 500, such as in the form of integrated magnetic slider assembly 500c, comprises the first end 506, the second end 510, and the slider portion 502 coupled to or integrated with the hanger portion 516. As further shown in FIG. 22B, the slider portion 502 comprises the head portion 504a with the contact portion 504b, and the neck portion 508 coupled to or integrated with the hanger portion 516. FIG. 22B shows the head portion 504a of the slider portion 502 suspended in the longitudinal hanging device 62 (see FIG. 22B).

FIG. 22B further shows the hanger portion 516 with the body portion 518, and the magnet 58 may be inserted into the opening 520 and coupled to the hanger portion 516 via compression fitting, via an adhesive material, or via another suitable coupling mechanism. As further shown in FIG. 22B, the magnet 58 comprises the north pole surface 71 and the south pole surface 73.

FIG. 22B further shows the attachment element 84a, such as in the form of snap fastener 86a inserted through the through opening 522. The attachment element 84a (see FIG. 22B), such as in the form of snap fastener 86a (see FIG. 22B), comprises the first side 524a (see FIG. 22B) and the second side 524b (see FIG. 22B).

FIG. 23A is an illustration of a close-up plan view of a system 501 having another embodiment of an integrated magnetic slider assembly 500, such as in the form of integrated magnetic slider assembly 500d, of the disclosure. As shown in FIG. 23A, the system 501 comprises the integrated magnetic slider assembly 500, such as in the form of integrated magnetic slider assembly 500d, installed in the hanging partition 20c. The integrated magnetic slider assembly 500 (see FIG. 23A), such as in the form of integrated magnetic slider assembly 500d (see FIG. 23A), may preferably be attached to a longitudinal hanging device 62 (see FIG. 20A), such as in the form of curtain rail 64 (see FIG. 20A).

As further shown in FIG. 23A, the integrated magnetic slider assembly 500, such as in the form of integrated magnetic slider assembly 500d, comprises a first end 542 and a second end 532. As further shown in FIG. 23A, the integrated magnetic slider assembly 500, such as in the form of integrated magnetic slider assembly 500d, comprises a slider portion 538 coupled to a hanger portion 526.

Preferably, the slider portion 538 (see FIG. 23A) and the hanger portion 526 (see FIG. 23A) of the integrated magnetic slider assembly 500 (see FIG. 23A), such as in the form of integrated magnetic slider assembly 500d (see FIG. 23A), comprise a two-piece configuration 534. Preferably, the slider portion 538 (see FIG. 23A) and the hanger portion 526 (see FIG. 23A) of the integrated magnetic slider assembly 500 (see FIG. 23A), such as in the form of integrated magnetic slider assembly 500d (see FIG. 23A), are made of a rigid plastic material, such as nylon, for example, nylon 6/6 (polyhexamethylene adiptimide); or a metal material such as steel, stainless steel, aluminum, or another suitable metal material; or wood; or another suitable natural or man-made substantially rigid material. Preferably, the slider portion 538 (see FIG. 23A) and the hanger portion 526 (see FIG. 23A) of the integrated magnetic slider assembly 500 (see FIG. 23A), such as in the form of integrated magnetic slider assembly 500d (see FIG. 23A), are formed of a material having a tensile strength greater than the tear strength of the hanging partition 20c (see FIG. 23A).

The longitudinal hanging device 62 (see FIG. 22A), such as in the form of curtain rail 64 (see FIG. 22A), may be made of a metal material such as steel, stainless steel, aluminum, or another suitable metal material; or a rigid plastic material, such as nylon, for example, nylon 6/6 (polyhexamethylene adiptimide); or another suitable natural or man-made substantially rigid material. Preferably, if the slider portion 538 (see FIG. 23A) and the hanger portion 526 (see FIG. 23A) are made of nylon, for example, nylon 6/6 (polyhexamethylene adiptimide), the longitudinal hanging device 62 (see FIG. 22A), such as in the form of curtain rail 64 (see FIG. 22A), is made of a metal material, and preferably, if the slider portion 538 (see FIG. 23A) and the hanger portion 526 (see FIG. 23A) are made of a metal material, the longitudinal hanging device 62 (see FIG. 22A), such as in the form of curtain rail 64 (see FIG. 22A), is made of nylon, for example, nylon 6/6 (polyhexamethylene adiptimide).

The slider portion 538 (see FIG. 23A) comprises a head portion 540a (see FIG. 23A) with a contact portion 540b (see FIG. 23A). The slider portion 538 (see FIG. 23A) further comprises a neck portion 544 (see FIG. 23A), a flange portion 548 (see FIG. 23A) coupled to the neck portion 544 (see FIG. 23A), and a connector portion 546 (see FIG. 23A) coupled to or integrated with the flange portion 548 (see FIG. 23A). The connector portion 546 (see FIG. 23A) of the slider portion 538 (see FIG. 23A) preferably comprises an opening 536 (see FIG. 23B) for insertion of an engaging portion 528 (see FIG. 23A) of the hanger portion 526 (see FIG. 23A).

The hanger portion 526 (see FIG. 23A) comprises the engaging portion 528 (see FIG. 23A), a body portion 530 (see FIG. 23A), and an opening 520 (see FIG. 23A) through the body portion 530 (see FIG. 23A). The engaging portion 528 (see FIG. 23A) of the hanger portion 526 (see FIGS. 23A-23B) is configured for insertion through the opening 536 (see FIG. 23B) of the connector portion 546 (see FIGS. 23A-23B) of the slider portion 538 (see FIGS. 23A-23B).

A magnet 58 (see FIG. 23A) may be inserted into the opening 520 (see FIG. 23A), such as in the form of a through opening 522 (see FIG. 21), and the magnet 58 (see FIG. 23A) may be coupled to the hanger portion 526 (see FIG. 23A) via compression fitting, via an adhesive material, or via another suitable coupling mechanism. Alternatively, the opening 520 (see FIG. 23A) may be in the form of a recessed opening on each side of the hanger portion 526 (see FIG. 23A), and a magnet 58 (see FIG. 23A) may be inserted into each recessed opening on each side of the hanger portion 526 (see FIG. 23A), and each magnet 58 (see FIG. 23A) may be coupled to the hanger portion 526 (see FIG. 23A) via compression fitting, via an adhesive material, or via another suitable coupling mechanism.

The magnet 58 (see FIG. 23A) is preferably made of an FAA approved magnetic material comprising neodymium, neodymium iron boron, hard ferromagnetic material, samarium cobalt, alnico, ceramic, ferrite, iron, nickel, alloys of rare earth metals, or another suitable FAA approved magnetic material.

As further shown in FIG. 23A, the hanger portion 526 may comprise an attachment element 84b, such as in the form of a snap fastener 86b, inserted through or coupled in a through opening 522 (see FIG. 21). The attachment element 84b (see FIG. 23A), such as in the form of snap fastener 86b (see FIG. 23A), comprises a first side 524a (see FIG. 23B) and a second side 524b (see FIG. 23B). The attachment element 84b (see FIG. 23A), such as in the form of a snap fastener 86b (see FIG. 23A), may preferably be used to facilitate attachment of the hanging partition 20c (see FIG. 23A) to the hanger portion 526 (see FIG. 23A) of the integrated magnetic slider assembly 500 (see FIG. 23A), such as in the form of integrated magnetic slider assembly 500d (see FIG. 23A). Although the attachment element 84b (see FIG. 23A) may comprise a snap fastener 86b (see FIG. 23A), the attachment element 84b (see FIG. 23A) may also comprise a hook and loop fastener (Velcro) (not shown), a hook (not shown), a clip (not shown), a clamp (not shown), a latch (not shown), or another suitable attachment element.

The slider portion 538 (see FIG. 23A) may preferably be coupled to a longitudinal hanging device 62 (see FIG. 20A), such as in the form of curtain rail 64 (see FIG. 20A). When the integrated magnetic slider assembly 500 (see FIG. 23A), such as in the form of integrated magnetic slider assembly 500d (see FIG. 23A), is coupled to the longitudinal hanging device 62 (see FIG. 20A), the neck portion 544 (see FIG. 23A) of the slider portion 538 (see FIG. 23A) is preferably configured to fit in the gap 68 (see FIG. 20A) of the longitudinal hanging device 62 (see FIG. 20A), and the contact portions 540b (see FIG. 23A) of the head portion 540a (see FIG. 23A) are preferably configured to contact the first track 69a (see FIG. 20A) and the second track 69b (see FIG. 20A), respectively, of the longitudinal hanging device 62 (see FIG. 20A) to suspend the slider portion 538 (see FIG. 23A) within the longitudinal hanging device 62 (see FIG. 20A).

As further shown in FIG. 23A, the hanger portion 526 with the magnet 58 and the snap fastener 86b may be substantially inserted or installed in the top end (see FIGS. 25, 26) of the upper portion 57 of the hemmed portion 56 of the hanging partition 20c, such as in the form of curtain panel 52. In particular, the engaging portion 528 (see FIG. 23A) may be curved in shape and inserted through opening 536 (see FIG. 23B) of the connector portion 546 (see FIG. 23A) of the slider portion 538 (see FIG. 23A). The engaging portion 528 (see FIG. 23A) may have two extended portions that may be inserted through one or more openings 61 (see FIG. 23A) in the hanging partition 20c (see FIG. 23A). One extended portion of the engaging portion 528 (see FIG. 23A) extends to the portion of the hanger portion 526 (see FIG. 23A) with the magnet 58 (see FIG. 23A), and the other extended portion of the engaging portion 528 (see FIG. 23A) extends to the body portion 530 (see FIG. 23A) and the attachment element 84b (see FIG. 23A), such as in the form of snap fastener 86b (see FIG. 23A).

When the integrated magnetic slider assembly 500 (see FIG. 23A), such as in the form of integrated magnetic slider assembly 500d (see FIG. 23A), is installed in the hanging partition 20c (see FIG. 23A), the engaging portion 528 (see FIG. 23A) of the hanger portion 526 (see FIG. 23A) extends through one or more openings 61 (see FIG. 23A) at the top end 51 (see FIGS. 25, 26) of the upper portion 57 (see FIG. 23A) of the hemmed portion 56 (see FIG. 23A) of the hanging partition 20c (see FIG. 23A), and the attachment element 84b (see FIG. 23A), such as in the form of a snap fastener 86b (see FIG. 23A), aids in securing the hanging partition 20c (see FIG. 23A) to the hanger portion 526 (see FIG. 23A) within the upper portion 57 (see FIG. 23A) of the hanging partition 20c (see FIG. 23A).

FIG. 23B is an illustration of a right side view of the integrated magnetic slider assembly 500, such as in the form of integrated magnetic slider assembly 500d, of FIG. 23A. As shown in FIG. 23B, the integrated magnetic slider assembly 500, such as in the form of integrated magnetic slider assembly 500d, preferably has the two-piece configuration 534 and comprises the first end 542, the second end 532, and the slider portion 538 coupled to or integrated with the hanger portion 526. As further shown in FIG. 23B, the slider portion 538 comprises the head portion 540a with the contact portion 540b, the neck portion 544, the flange portion 548 coupled to the neck portion 544, and the connector portion 546 having opening 536, where the connector portion 546 is coupled to or integrated with the flange portion 548. The connector portion 546 (see FIG. 23B) of the slider portion 538 (see FIG. 23B) preferably comprises the opening 536 (see FIG. 23B) for insertion of the engaging portion 528 (see FIG. 23B) of the hanger portion 526 (see FIG. 23B).

FIG. 23B further shows the hanger portion 526 with the engaging portion 528, the body portion 530, the opening 520 through the body portion 530 with the magnet 58 inserted through or coupled to the opening 520, and the attachment element 84b, such as in the form of snap fastener 86b, inserted through the through opening 522. The engaging portion 528 (see FIG. 23B) of the hanger portion 526 (see FIG. 23B) is configured for insertion through the opening 536 (see FIG. 23B) of the connector portion 546 (see FIG. 23B) of the slider portion 538 (see FIG. 23B).

FIG. 23B further shows the north pole surface 71 and the south pole surface 73 of the magnet 58. FIG. 23B further shows the first side 524a and the second side 524b of the attachment element 84b, such as in the form of snap fastener 86b.

Figure 24:
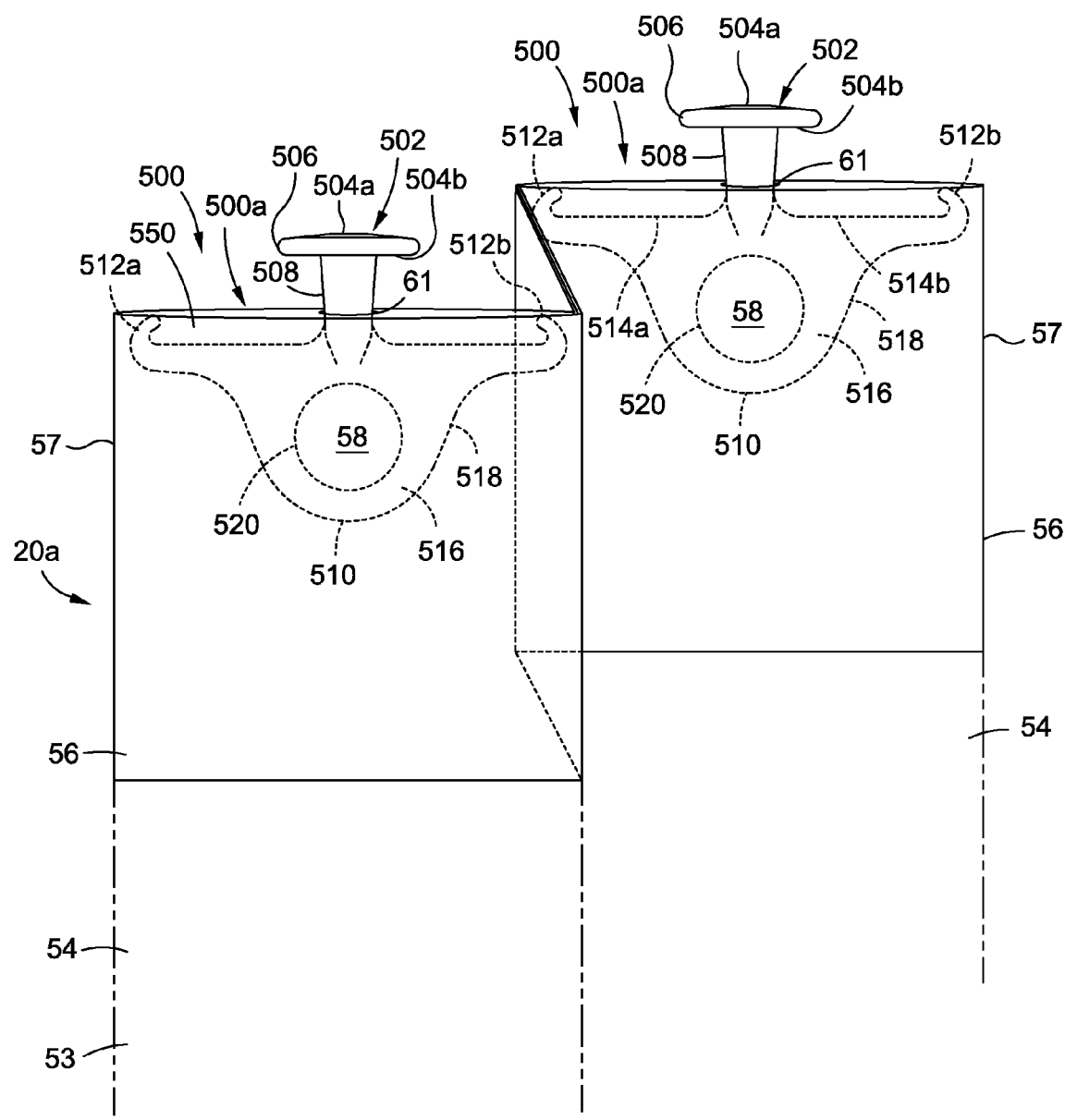
FIG. 24 is an illustration of a close-up plan view of two of the integrated magnetic slider assembly of FIG. 20A, each in an installed position in a hanging partition.

FIG. 24 is an illustration of a close-up plan view of two integrated magnetic slider assemblies 500, such as in the form of integrated magnetic slider assemblies 500a, as shown in FIG. 20A, each in an installed position 550 in the hanging partition 20a. FIG. 24 shows the hanging partition 20a, such as in the form of curtain panel 53, having a plurality of pleats 54, where each pleat 54 may have a hemmed portion 56 positioned at the upper portion 57 of the hanging partition 20a. When the hanging partition 20a (see FIG. 24) is in a retracted position 28 (see FIG. 25), preferably, the plurality of pleats 54 (see FIG. 24) fold together in a stacked configuration and are held together with the magnets 58 (see FIG. 24) of the integrated magnetic slider assembly 500 (see FIG. 24).

Each integrated magnetic slider assembly 500 (see FIG. 24), such as in the form of integrated magnetic slider assembly 500a (see FIG. 24), is preferably inserted through opening 61 (see FIG. 24) in the top end 51 (see FIGS. 25, 26) of the upper portion 57 (see FIG. 24) of the hemmed portion 56 (see FIG. 24), such that the neck portion 508 (see FIG. 24) is in contact with the opening 61 (see FIG. 24), the head portion 504a (see FIG. 24) with the contact portion 504b (see FIG. 24) at the first end 506 (see FIG. 24) of the slider portion 502 (see FIG. 24) is outside of the hanging partition 20a (see FIG. 24), and the hanger portion 516 (see FIG. 24) with the body portion 518 (see FIG. 24) having the opening 520 (see FIG. 24) at the second end 510 (see FIG. 24) housing the magnet 58 (see FIG. 24) is inserted inside the hanging partition 20a (see FIG. 24). The first lateral end portion 512a (see FIG. 24) and the second lateral end portion 512b (see FIG. 24) are preferably positioned adjacent the top end 51 (see FIGS. 25, 26) of the upper portion 57 (see FIG. 24) of the hemmed portion 56 of the hanging partition 20a and facilitate keeping the plurality of pleats 54 straight or substantially straight.

FIG. 25 is an illustration of a perspective view of a system 501 with integrated magnetic slider assemblies 500, such as in the form of integrated magnetic slider assemblies 500a, as shown in FIG. 20A, each in an installed position 550 in a hanging partition 20a that is in a retracted position 28. FIG. 25 shows the hanging partition 20a, such as in the form of curtain panel 53, having the plurality of pleats 54. When the hanging partition 20a (see FIG. 25) is in the retracted position 28 (see FIG. 25), preferably, the plurality of pleats 54 (see FIG. 25) fold together in a stacked configuration and are held together with the magnets 58 (see FIG. 25) of the integrated magnetic slider assembly 500 (see FIG. 25) positioned in the upper portion 57 of the hanging partition 20a.

Each integrated magnetic slider assembly 500 (see FIG. 25), such as in the form of integrated magnetic slider assembly 500a (see FIG. 25), is preferably inserted through opening 61 (see FIG. 25) in the top end 51 (see FIGS. 25, 26) of the upper portion 57 (see FIG. 25) of the hemmed portion 56 (see FIG. 25), such that the neck portion 508 (see FIG. 25) is in contact with the opening 61 (see FIG. 25), the slider portion 502 (see FIG. 25) is outside of the hanging partition 20a (see FIG. 25) and suspended within the longitudinal hanging device 62 (see FIG. 25), such as in the form of curtain rail 64 (see FIG. 25), and the hanger portion 516 (see FIG. 24) with the magnet 58 (see FIG. 25) is inserted inside the hanging partition 20a (see FIG. 25). The hanging partition 20a (see FIG. 25) preferably has a magnet 58 (see FIG. 25) positioned in each integrated magnetic slider assembly 500, such as in the form of integrated magnetic slider assembly 500a. FIG. 25 shows the north pole surface 71 of the magnet 58.

The magnets 58 (see FIG. 25) may be positioned in adjacent pleats 54 (see FIG. 25) or in every other pleat 54 (see FIG. 25) and are preferably aligned with respect to each other to cause or create a magnetic attraction between the magnets 58 (see FIG. 25), in order to hold the plurality of pleats 54 (see FIG. 25) and the hemmed portions 56 (see FIG. 25) together when the plurality of pleats 54 (see FIG. 25) and the hemmed portions 56 (see FIG. 25) fold in a stacked configuration when the hanging partition 20a (see FIG. 25) is in the retracted position 28 (see FIG. 25). As shown in FIG. 25, the magnets 58 are also preferably aligned or arranged with respect to each other in order to automatically stack the plurality of pleats 54 and the hemmed portions 56 together when the hanging partition 20a is in the retracted position 28.

The hanging partition 20a (see FIG. 25) is preferably used for partitioning at least two cabin areas 24 (see FIG. 1) in the cabin 22 (see FIG. 1) of the aircraft 10 (see FIG. 1). As shown in FIG. 25, the hanging partition 20a comprises at least one curtain panel 53 made of a flame resistant material and having a plurality of pleats 54. Each pleat 54 (see FIG. 25) has the hemmed portion 56 (see FIG. 25) in the upper portion 57 (see FIG. 25) of the curtain panel 53 (see FIG. 25). FIG. 25 further shows the lower portion 55 of the hanging partition 20a and side portions 59 of the hanging partition 20a.

As shown in FIG. 25, the integrated magnetic slider assemblies 500, such as in the form of integrated magnetic slider assemblies 500a, suspend the hanging partition 20a, such as in the form of curtain panel 53, from the longitudinal hanging device 62, such as curtain rail 64. FIG. 25 shows the substantially square shaped configuration 66 of the curtain rail 64 and shows the gap 68, the first track 69a, the second track 69b, and the first end 70 of the longitudinal hanging device 62.

FIG. 26 is an illustration of a close-up perspective view of a system 501 with integrated magnetic slider assemblies 500, such as in the form of integrated magnetic slider assemblies 500a, as shown in FIG. 20A, each in the installed position 550 in the hanging partition 20a, such as in the form of curtain 50, that is in an extended position 30.

FIG. 26 shows the hanging partition 20a having the plurality of pleats 54, where each magnet 58 in the integrated magnetic slider assembly 500 may be positioned in every other pleat 54. When the hanging partition 20a (see FIG. 26) is in the extended position 30 (see FIG. 26), preferably, the plurality of pleats 54 (see FIG. 26) and the hemmed portion 56 (see FIG. 26) of the upper portion 57 (see FIG. 26) extend along the longitudinal hanging device 62 (see FIG. 26), such as curtain rail 64 (see FIG. 26).

Each integrated magnetic slider assembly 500 (see FIG. 26), such as in the form of integrated magnetic slider assembly 500a (see FIG. 26), is preferably inserted through opening 61 (see FIG. 26) in the top end 51 (see FIGS. 25, 26) of the upper portion 57 (see FIG. 26) of the hemmed portion 56 (see FIG. 26), such that the neck portion 508 (see FIG. 26) is in contact with the opening 61 (see FIG. 26), the slider portion 502 (see FIG. 25) is outside of the hanging partition 20a (see FIG. 26) and suspended within the longitudinal hanging device 62 (see FIG. 26), such as in the form of curtain rail 64 (see FIG. 26), and the hanger portion 516 (see FIG. 24) with the magnet 58 (see FIG. 26) is inserted inside the hanging partition 20a (see FIG. 26). The hanging partition 20a (see FIG. 26) preferably has a magnet 58 (see FIG. 26) positioned in each integrated magnetic slider assembly 500 (see FIG. 26), such as in the form of integrated magnetic slider assembly 500a (see FIG. 26).

As shown in FIG. 26, the integrated magnetic slider assemblies 500, such as in the form of integrated magnetic slider assemblies 500a, suspend the hanging partition 20a, such as in the form of curtain 50, from the longitudinal hanging device 62, such as curtain rail 64. FIG. 26 shows the substantially square shaped configuration 66 of the curtain rail 64 and shows the gap 68, the first track 69a, the second track 69b, and the first end 70 and the second end 72 of the longitudinal hanging device 62.

Figure 27A:
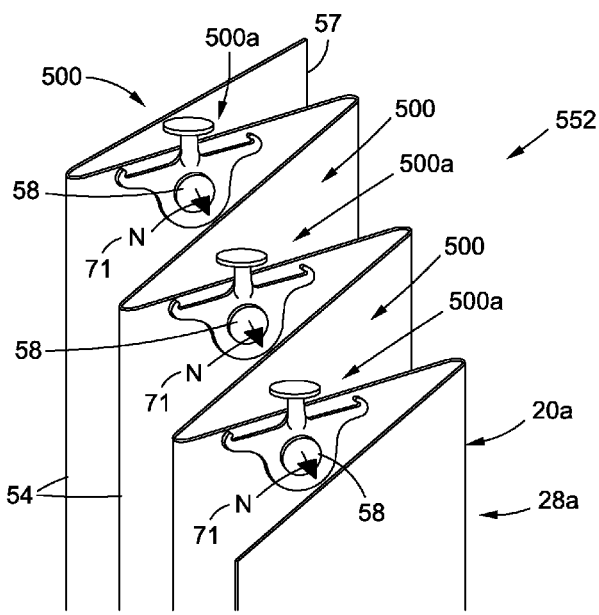
FIG. 27A is an illustration of a magnet orientation of multiple of the integrated magnetic slider assembly of FIG. 20A installed in a hanging partition that is in a partially retracted position.

FIG. 27A is an illustration of a magnet orientation 552 of multiple of, or a multiple number of, the integrated magnetic slider assembly 500, such as in the form of integrated magnetic slider assembly 500a, of FIG. 20A, installed in a hanging partition 20a that is in a partially retracted position 28a. As shown in FIG. 27A, the magnets 58 of the integrated magnetic slider assemblies 500, such as in the form of integrated magnetic slider assemblies 500a, draw in the plurality of pleats 54 together so that they can form a stacked configuration when in the retracted position 28 (see FIG. 25). FIG. 27A shows the north pole surface 71 of the magnets 58, and the magnet orientation 552 of the magnets 58, when the magnets 58 are all aligned adjacent or substantially adjacent to each other in the same north pole facing direction (N).

Figure 27B:
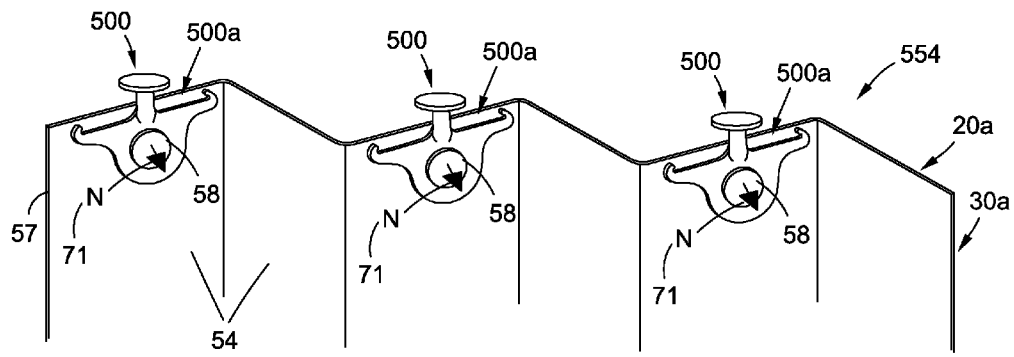
FIG. 27B is an illustration of a magnet orientation of multiple of the integrated magnetic slider assembly of FIG. 20A installed in a hanging partition that is in a partially extended position.

FIG. 27B is an illustration of a magnet orientation 554 of multiple of, or a multiple number of, the integrated magnetic slider assembly 500, such as in the form of integrated magnetic slider assembly 500a, of FIG. 20A installed in a partially extended position 30a. As shown in FIG. 27B, the magnets 58 of the integrated magnetic slider assemblies 500, such as in the form of integrated magnetic slider assemblies 500a, and the plurality of pleats 54 are extended outwardly and away from each other to eventually reach the extended position 30 (see FIG. 26). FIG. 27B shows the north pole surface 71 of the magnets 58, and the magnet orientation 554 of the magnets 58, when the magnets 58 are extended away from each other with the magnets 58 positioned in the north pole facing direction (N).

Figure 27C:
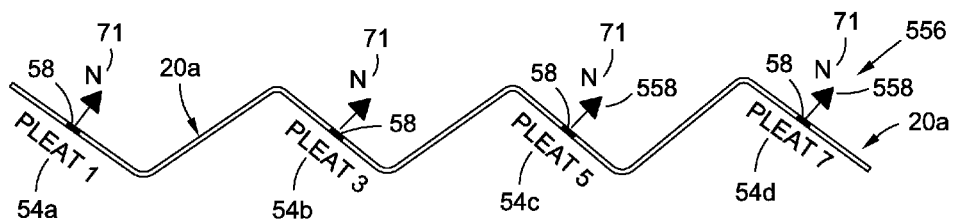
FIG. 27C is an illustration of a magnet orientation of multiple of the integrated magnetic slider assembly of FIG. 20A installed in a hanging partition where the magnets are in a uniform direction.

FIG. 27C is an illustration of a top view of a magnet orientation 556 of multiple or, or a multiple number of, the integrated magnetic slider assembly 500 (see FIG. 27B), such as in the form of integrated magnetic slider assembly 500a (see FIG. 27B), of FIG. 20A installed in a hanging partition 20a, where the magnets 58 are in a uniform direction 558, such as, for example, the north pole facing direction (N). FIG. 27C shows the magnets 58 in pleat 1 54a, pleat 3 54b, pleat 5 54c, and pleat 7 54d, with the north pole surface 71 of the magnets 58 in the north pole facing direction (N). Installation of the multiple integrated magnetic slider assemblies 500 (see FIG. 27B), such as in the form of integrated magnetic slider assemblies 500a (see FIG. 27B), with the magnets 58 (see FIG. 27C) is orientation dependent and the magnets 58 (see FIG. 27C) are preferably in a uniform direction 558 (see FIG. 27C).

FIG. 28 is an illustration of a perspective view of a system 501 having integrated magnetic slider assemblies 500 for hanging partitions 20a installed in an aircraft 10. As shown in FIG. 28, the hanging partitions 20a are suspended from the longitudinal hanging device 62, such as in the form of curtain rail 64, and the hanging partitions 20a are in a retracted position 28, such that the emergency exit locator sign 32 in the cabin 22 is visible to occupants 36 (see FIG. 1) in seats 38 (see FIG. 1) and is visible to occupants 36 (see FIG. 1) approaching the emergency exit locator sign 32 along the aisle 34 of the aircraft 10. As further shown in FIG. 28, each hanging partition 20a may further comprise one or more magnetic tie-back elements 96 having one or more magnets 98 to tie back each hanging partition 20a in the retracted position 28.

In another embodiment of the disclosure, there is provided an aircraft 10 (see FIGS. 1, 28). The aircraft 10 (see FIG. 1) comprises a fuselage 14 (see FIG. 1) having a cabin 22 (see FIGS. 1, 28) with a cabin ceiling 25 (see FIG. 28). The aircraft 10 (see FIG. 1) comprises at least one wing 12 (see FIG. 1) coupled to the fuselage 14 (see FIG. 1). The aircraft 10 (see FIG. 28) further comprises a system 501 (see FIG. 28) for an integrated magnetic slider assembly 500 (see FIG. 28).

As discussed in detail above, the system 501 (see FIG. 28) comprises the integrated magnetic slider assembly 500 (see FIG. 28) comprising a slider portion 502 (see FIGS. 20A, 21, 22A) or slider portion 538 (see FIG. 23A). As further discussed in detail above, the system 501 (see FIG. 28) comprises the integrated magnetic slider assembly 500 (see FIG. 28) comprising a hanger portion 516 (see FIGS. 20A, 21, 22A) coupled to or integrated with the slider portion 502 (see FIGS. 20A, 21, 22A), or comprising a hanger portion 526 (see FIG. 23A) coupled to the slider portion 538 (see FIG. 23A). As further discussed in detail above, the system 501 (see FIG. 28) comprises the integrated magnetic slider assembly 500 (see FIG. 28) comprising one or more magnets 58 (see FIGS. 20A, 21, 22A) coupled to the hanger portion 516 (see FIGS. 20A, 21, 22A), or one or more magnets 58 (see FIGS. 20A, 21, 22A) coupled to the hanger portion 526 (see FIG. 23A). The system 501 (see FIG. 28) further comprises a longitudinal hanging device 62 (see FIG. 28), such as in the form of curtain rail 64 (see FIG. 28) coupled to the cabin ceiling 25 (see FIG. 28) and configured for coupling to and suspending the slider portion 502 (see FIGS. 20A, 21, 22A) or slider portion 538 (see FIG. 23A) of the integrated magnetic slider assembly 500 (see FIG. 28).

The system 501 (see FIG. 28) further comprises at least one hanging partition 20 (see FIG. 13), such as hanging partition 20a (see FIG. 28) configured for coupling to the hanger portion 516 (see FIGS. 20A, 21, 22A) or the hanger portion 526 (see FIG. 23A) of the integrated magnetic slider assembly 500 (see FIG. 28), the at least one hanging partition 20a (see FIG. 28) having a plurality of pleats 54 (see FIGS. 25, 26). All the magnets 58 (see FIG. 25) in the integrated magnetic slider assembly 500 (see FIGS. 25, 28) are preferably vertically aligned with respect to each other to cause a magnetic attraction between adjacent magnets 58 (see FIG. 25) in order to hold the plurality of pleats 24 (see FIG. 25) together, when the at least one hanging partition 20a (see FIG. 25) is in the retracted position 28 (see FIGS. 25, 28).

The hanger portion 516 (see FIG. 22A) of the integrated magnetic slider assembly 500 (see FIG. 22A) may further comprise an attachment element 84a (see FIG. 22A) comprising a snap fastener 86a (see FIG. 22A) coupled to one or more through openings 522 (see FIG. 22A) in the hanger portion 516 (see FIG. 22A). In another embodiment, the hanger portion 516 (see FIG. 21) of the integrated magnetic slider assembly 500 (see FIG. 21) may have two magnets 58 (see FIG. 21) that may be coupled to one or more openings 520 (see FIG. 21), such as first opening 520a (see FIG. 21) and second opening 520b (see FIG. 21) in the hanger portion 516 (see FIG. 21).

Each of the plurality of pleats 24 (see FIG. 25) of the at least one hanging partition 20a (see FIG. 25) may have a hemmed portion 56 (see FIG. 25) with an opening 61 (see FIG. 25) at an upper portion 57 (see FIG. 25) of the at least one hanging partition 20a (see FIG. 25), each opening 61 (see FIG. 25) being in close proximity to the cabin ceiling 25 (see FIG. 28) of the cabin 22 (see FIG. 28), and further wherein the hanger portion 516 (see FIG. 20A) of the integrated magnetic slider assembly 500 (see FIGS. 20A, 25) is positioned within each of two or more hemmed portions 56 (see FIGS. 20A, 25).

Preferably, all of the magnets 58 (see FIG. 25) are laterally stacked within and across the upper portion 57 (see FIG. 25) of the at least one hanging partition 20a (see FIG. 25), when the at least one hanging partition 20a (see FIG. 25) is in the retracted position 28 (see FIG. 25). The at least one hanging partition 20a (see FIG. 25) preferably partitions at least two cabin areas 24 (see FIG. 1) in the cabin 22 (see FIGS. 1, 28) of the aircraft 10 (see FIGS. 1, 28). When the at least one hanging partition 20a (see FIG. 28) is in the retracted position 28 (see FIG. 28), the at least one hanging partition 20a (see FIG. 28) does not obstruct an emergency exit locator sign 32 (see FIG. 28) in proximity to the at least one hanging partition 20a (see FIG. 28) in the aircraft 10 (see FIG. 28). The slider portion 502 (see FIGS. 20A, 21, 22A) and the hanger portion 516 (see FIGS. 20A, 21, 22A) preferably comprise a monolithic or unitary configuration 503 (see FIGS. 20B, 21, 22B). The slider portion 538 (see FIG. 23A) and the hanger portion 526 (see FIG. 23A) preferably comprise or a two-piece configuration 534 (see FIG. 23A).

Figure 29:
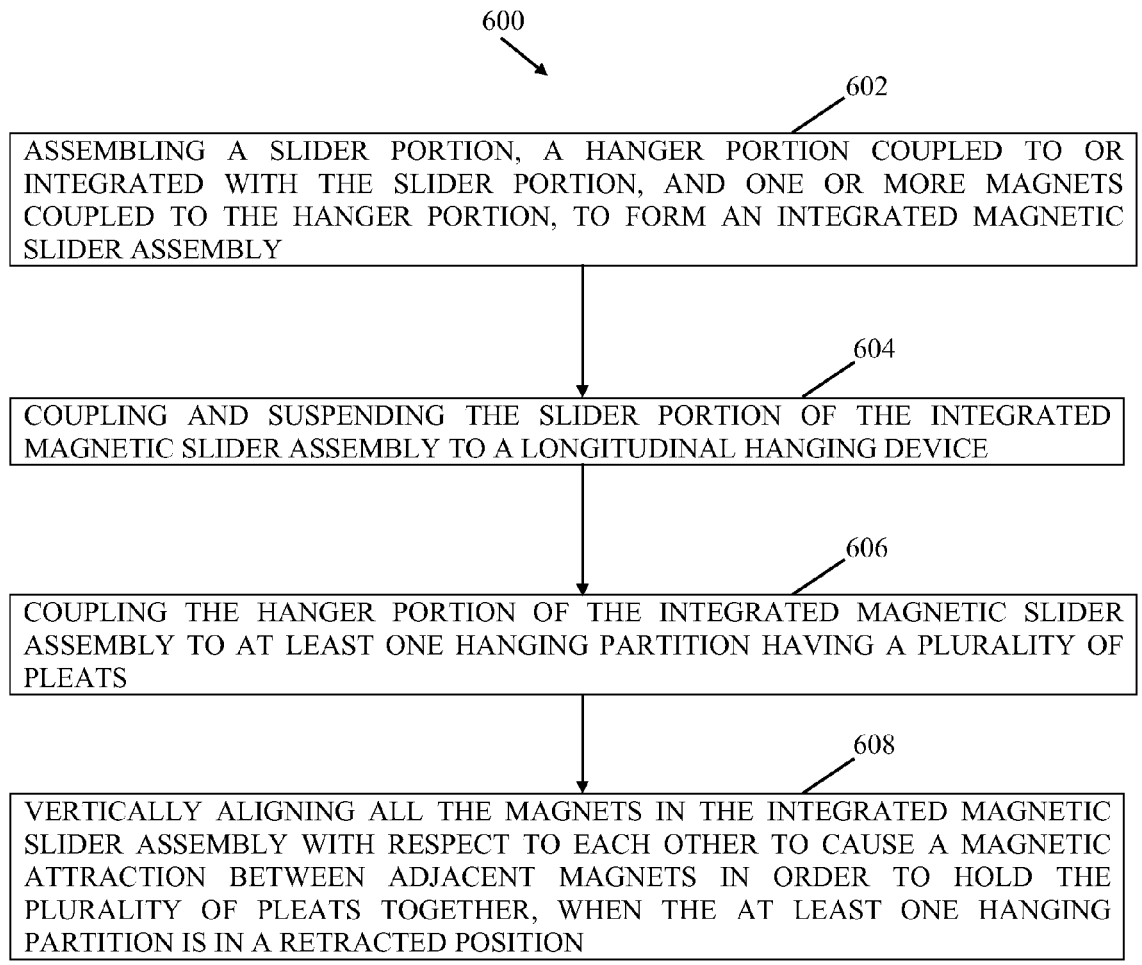

In another embodiment of the disclosure, there is provided a method 600 (see FIG. 29) of assembling a system 501 (see FIGS. 20A, 22A, 23A, 25, 26) for an integrated magnetic slider assembly 500 (see FIGS. 20A, 22A, 23A, 25, 26). FIG. 29 is an illustration of a flow diagram of an embodiment of the method 600 of the disclosure.

As shown in FIG. 29, the method 600 comprises step 602 of assembling a slider portion 502 (see FIG. 20A), a hanger portion 516 (see FIG. 20A) coupled to or integrated with the slider portion 502 (see FIG. 20A), and one or more magnets 58 (see FIG. 20A) coupled to the hanger portion 516 (see FIG. 20A), to form an integrated magnetic slider assembly 500 (see FIGS. 20A, 22A, 25, 26).

The assembling step 602 (see FIG. 29) may further comprise coupling an attachment element 84a (see FIG. 22A) comprising a snap fastener 86a (see FIG. 22A) to one or more through openings 522 (see FIG. 22A) in the hanger portion 516 (see FIG. 22A). The assembling step 602 (see FIG. 29) may further comprise coupling two magnets 58 (see FIG. 21) to one or more openings 520 (see FIG. 21) in the hanger portion 516 (see FIG. 21).

The assembling step 602 (see FIG. 29) may further comprise assembling one or more magnets 58 (see FIGS. 20A, 21, 22A, 23A) made of a material selected from the group consisting of an FAA approved magnetic material including neodymium, neodymium iron boron, hard ferromagnetic material, samarian cobalt, alnico, ceramic, ferrite, iron, nickel, and alloys of rare earth metals.

The assembling step 602 (see FIG. 29) may further comprise assembling the slider portion 502 (see FIGS. 20A, 21, 22A) and the hanger portion 516 (see FIGS. 20A, 21, 22A) in a monolithic or unitary configuration 503 (see FIGS. 20B, 21, 22B), or may further comprise assembling the slider portion 538 (see FIG. 23A) and the hanger portion 526 (see FIG. 23A) in a two-piece configuration 534 (see FIG. 23A).

As shown in FIG. 29, the method 600 further comprises step 604 of coupling and suspending the slider portion 502 (see FIG. 20A) of the integrated magnetic slider assembly 500 (see FIGS. 20A, 22A, 25, 26) to a longitudinal hanging device 62 (see FIGS. 20A, 22A, 25, 26).

As shown in FIG. 29, the method 600 further comprises step 606 of coupling the hanger portion 516 (see FIG. 20A) of the integrated magnetic slider assembly 500 (see FIGS. 20A, 22A, 25, 26) to at least one hanging partition 20 (see FIG. 13), such as hanging partition 20a (see FIGS. 20A, 22A, 25, 26) having a plurality of pleats 54 (see FIGS. 25, 26).

The step 606 of coupling the hanger portion 516 (see FIG. 20A) of the integrated magnetic slider assembly 500 (see FIGS. 20A, 22A, 25, 26) to the at least one hanging partition 20a (see FIGS. 20A, 25, 26) comprises forming in each of the plurality of pleats 54 (see FIGS. 25, 26) a hemmed portion 56 (see FIGS. 25, 26) with an opening 61 (see FIGS. 25, 26) at an upper portion 57 (see FIGS. 25, 26) of the at least one hanging partition 20a (see FIGS. 25, 26), and positioning the hanger portion 516 (see FIG. 20A) of the integrated magnetic slider assembly 500 (see FIGS. 20A, 22A, 25, 26) within each of two or more hemmed portions 56 (see FIGS. 25, 26).

The step 606 of coupling the hanger portion 516 (see FIG. 20A) of the integrated magnetic slider assembly 500 (see FIGS. 20A, 22A, 25, 26) to the at least one hanging partition 20a (see FIGS. 20A, 25, 26) comprises partitioning with the at least one hanging partition 20a (see FIGS. 20A, 25, 26) at least two cabin areas 24 (see FIG. 1) in a cabin 22 (see FIG. 1) of an aircraft 10 (see FIG. 1).

The step 606 of coupling the hanger portion 516 (see FIG. 20A) of the integrated magnetic slider assembly 500 (see FIGS. 20A, 22A, 25, 26) to the at least one hanging partition 20a (see FIGS. 20A, 25, 26) comprises, when the at least one hanging partition 20a (see FIGS. 20A, 25) is in a retracted position 28 (see FIG. 25), the at least one hanging partition 20a (see FIGS. 20A, 25, 26) does not obstruct an emergency exit locator sign 32 (see FIG. 28) in proximity to the at least one hanging partition 20a (see FIG. 28) in the aircraft 10 (see FIG. 28).

As shown in FIG. 29, the method 600 further comprises step 608 of vertically aligning all the magnets 58 (see FIGS. 20A, 22A, 23A, 25, 26) in each of the integrated magnetic slider assemblies 500 (see FIGS. 20A, 22A, 23A, 25, 26) with respect to each other to cause a magnetic attraction between adjacent magnets 58 in order to hold the plurality of pleats 54 (see FIGS. 25, 26) together, when the at least one hanging partition 20a (see FIGS. 20A, 25) is in a retracted position 28 (see FIG. 25).

The step 608 of vertically aligning all the magnets 58 (see FIGS. 20A, 22A, 23A, 25, 26) in each of the integrated magnetic slider assemblies 500 (see FIGS. 20A, 22A, 23A, 25, 26) further comprises laterally stacking the magnets 58 within and across the upper portion 57 (see FIG. 25) of the at least one hanging partition 20a (see FIG. 25), when the at least one hanging partition 20a (see FIG. 25) is in the retracted position 28 (see FIG. 25). Preferably, the magnets 58 (see FIGS. 20A, 22A, 23A, 25, 26) in each of the integrated magnetic slider assemblies 500 (see FIGS. 20A, 22A, 23A, 25, 26) are vertically aligned in order to cause a magnetic attraction between adjacent magnets 58 and in order to automatically stack and hold the plurality of pleats 54 (see FIGS. 25, 26) together laterally within and across only the upper portion 57 (see FIG. 25) of the hanging partition 20a (see FIG. 25), when the hanging partition 20a (see FIG. 25) is in the retracted position 28 (see FIG. 25).

One or more of the embodiments of the system 501 (see FIGS. 25, 26, 28) and method 600 (see FIG. 28) for integrated magnetic slider assembly 500 (see FIGS. 20A, 21, 22A, 23A) for the hanging partition 20a (see FIGS. 20A, 25, 28) of the disclosure provide numerous advantages. The disclosed embodiments provide for an integrated magnetic slider assembly 500 (see FIGS. 20A, 21, 22A, 23A) that includes direct integration of one or more magnets 58 (see FIGS. 20A, 21, 22A, 23A) into the integrated magnetic slider assembly 500 (see FIGS. 20A, 21, 22A, 23A) and that allow the integrated magnetic slider assembly 500 (see FIGS. 20A, 21, 22A, 23A) to be easily replaced in existing hanging partitions 20 (see FIG. 1), thus allowing for post production inclusion. Additionally, the design of the integrated magnetic slider assembly 500 (see FIGS. 20A, 21, 22A, 23A) is stable and is not dependent on the dimensions of the hanging partition 20a (see FIGS. 25, 28). This may allow for interchangeable design and accommodation of multiple materials for the hanging partition 20a (see FIGS. 25, 28). Moreover, the integrated magnetic slider assembly 500 (see FIGS. 20A, 21, 22A, 23A) may be installed in new aircraft or retrofitted into existing aircraft 10 (see FIGS. 1, 28) without modification to the existing hanging partition 20 (see FIG. 1).

Further, the integrated magnetic slider assembly 500 (see FIGS. 20A, 21, 22A, 23A) and method 600 (see FIG. 28) enable easier replacement and repair of the integrated magnetic slider assembly 500 (see FIGS. 20A, 21, 22A, 23A), as compared to slider assemblies and systems that do not incorporate magnets 58 into the slider assemblies and systems. In addition, the integrated magnetic slider assembly 500 (see FIGS. 20A, 21, 22A, 23A) removes the need for pockets at the upper portion 57 (see FIG. 25) of the hanging partition 20a (see FIGS. 25, 28) that may be used to carry or hold the magnets 58 (see FIG. 25).

In addition, the integrated magnetic slider assembly 500 (see FIGS. 20A, 21, 22A, 23A) and method 600 (see FIG. 28) allow for an automatic, hands-free stack-up of the hanging partition 20a (see FIGS. 25, 28), when the hanging partition 20a (see FIGS. 25, 28) is moved to a retracted position 28 (see FIGS. 25, 28). When the hanging partition 20a (see FIGS. 25, 28) is neatly stacked up, the hanging partition 20a (see FIGS. 25, 28) hangs straight, and the hanging partition 20a (see FIG. 28) does not obstruct any emergency exit locator sign 32 (see FIG. 28) or signs in close proximity to the hanging partition 20a (see FIG. 28), thus facilitating the visibility of the emergency exit locator sign 32 (see FIG. 28) or signs to occupants 36 (see FIG. 1) of a vehicle such as an aircraft 10 (see FIGS. 1, 28). This can also reduce possible violations of FAR regulations involving emergency exit signs, such as 14 C.F.R. Section 25.811(d). The automatic, hands-free stack-up of the hanging partition 20a (see FIGS. 25, 28) also decreases the workload of the flight crew as they do not have to spend added time arranging the hanging partition 20a (see FIGS. 25, 28) so that the stack-up is neatly stacked. The automatic, hands-free stack-up of the hanging partition 20a (see FIGS. 25, 28) frees up the flight crew to be able to accomplish other tasks. Functionally, the hanging partition 20a (see FIGS. 25, 28) automatically closes when attempting to stow or retract when the aircraft 10 (see FIG. 1) takes off, lands, and taxis on the runway. When the hanging partition 20a (see FIG. 26) needs to be expanded or opened, the magnets 58 (see FIG. 26) can easily release away each other to fully expand the hanging partition 20a (see FIG. 26).

Moreover, the integrated magnetic slider assembly 500 (see FIGS. 20A, 21, 22A, 23A) and method 600 (see FIG. 28) provide a hanging partition 20a (see FIGS. 25, 26) having pleated portions 54 (see FIGS. 25, 26) that fold in a stacking configuration, and the pleated portions 54 (see FIGS. 25, 26) can be held together by the one or more magnets 58 (see FIGS. 25, 26) that are integral with the integrated magnetic slider assembly 500 (see FIGS. 20A, 21, 22A, 23A), that remove the need for pockets in the upper portion 57 (see FIGS. 25, 26) of the hanging partition 20a (see FIGS. 25, 26), that facilitate the restraint of the hanging partition 20a (see FIGS. 25, 26) during any aircraft 10 (see FIG. 1) movements.

Further, the integrated magnetic slider assembly 500 (see FIGS. 20A, 21, 22A, 23A) and method 600 (see FIG. 28) allow for an interchangeable design that may be installed in new aircraft or certain existing aircraft that does not require modification of the hanging partition 20a (see FIGS. 25, 26) to install. Additionally, the inclusion of the magnet 58 (see FIGS. 25, 26) into the integrated magnetic slider assembly 500 (see FIGS. 20A, 21, 22A, 23A) enables easier replacement and repair.

In addition, the integrated magnetic slider assembly 500 (see FIGS. 20A, 21, 22A, 23A) and method 600 (see FIG. 28) include the direct integration of the magnet 58 (see FIGS. 25, 26) into the integrated magnetic slider assembly 500 (see FIGS. 20A, 21, 22A, 23A) that may preferably improve the ergonomics for flight crew on the aircraft 10 (see FIG. 1).

Example

An aircraft curtain with magnets according to one of the embodiments of the disclosure was assembled and compared to a known aircraft curtain without magnets. All data was recorded with only one assembled magnetic curtain and one aircraft curtain. Both curtains were made of an FAA flammability approved wool material. The weight of the aircraft curtain with magnets was 2.81 pounds, and the weight of the stack of magnets used was 1.1 pounds. The weight of the aircraft curtain without magnets was 2.73 pounds. The thickness of the stack-up across the retracted aircraft curtain with magnets (including glider elements) was 5.8125 inches. The thickness of the stack-up across the retracted aircraft curtain without magnets (including glider elements) was 6.375 inches. Both stack-up measurements were even at 5.5 inches, that is, the stack-up that was manually pressed together was the same measurement as the stack-up that had magnets. The appearance of the stack-up of the aircraft curtain with magnets was neat when in the retracted position. The appearance of the stack-up of the aircraft curtain without magnets was loose when in the retracted position. The aircraft curtain with magnets and the aircraft curtain without magnets were both retracted and expanded four (4)

times, and the aircraft curtain with magnets required less work to retract and expand than the aircraft curtain without magnets.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A system for an integrated magnetic slider assembly, the system comprising:
    the integrated magnetic slider assembly comprising:
        a slider portion;
        a hanger portion coupled to or integrated with the slider portion, the hanger portion having a head portion, a neck portion, first and second shoulder portions coupled to the neck portion, first and second lateral end portions coupled to the respective first and second shoulder portions, and a body portion with an opening through the body portion; and
        one or more magnets inserted into the opening of the hanger portion;
    a longitudinal hanging device configured for coupling to and suspending the slider portion of the integrated magnetic slider assembly; and
    at least one hanging partition configured for coupling to the hanger portion of the integrated magnetic slider assembly, the at least one hanging partition having a plurality of pleats;
    wherein all the magnets in a plurality of integrated magnetic slider assemblies are vertically aligned with respect to each other to cause a magnetic attraction between adjacent magnets in order to hold the plurality of pleats together, when the at least one hanging partition is in a retracted position.

2. The system of claim 1 wherein each of the plurality of pleats has a hemmed portion with an opening at an upper portion of the at least one hanging partition, and further wherein the hanger portion of the integrated magnetic slider assembly is positioned within each of two or more hemmed portions.

3. The system of claim 1 wherein all of the magnets are laterally stacked within and across an upper portion of the at least one hanging partition, when the at least one hanging partition is in the retracted position.

4. The system of claim 1 wherein the slider portion and the hanger portion comprise either a monolithic configuration or a two-piece configuration.

5. The system of claim 1 wherein the at least one hanging partition partitions at least two cabin areas in a cabin of an aircraft.

6. The system of claim 1 wherein when the at least one hanging partition is in the retracted position, the at least one hanging partition does not obstruct an emergency exit locator sign in proximity to the at least one hanging partition in an aircraft.

7. The system of claim 1 wherein two magnets are inserted into the opening through the body portion of the hanger portion.

8. An aircraft comprising:
    a fuselage having a cabin with a cabin ceiling;
    at least one wing coupled to the fuselage; and
    a system for an integrated magnetic slider assembly, the system comprising:
        the integrated magnetic slider assembly comprising:
            a slider portion;
            a hanger portion coupled to or integrated with the slider portion, the hanger portion having a head portion, a neck portion, first and second shoulder portions coupled to the neck portion, first and second lateral end portions coupled to the respective first and second shoulder portions, and a body portion with an opening through the body portion; and
            one or more magnets inserted into the opening of the hanger portion;
        a longitudinal hanging device coupled to the cabin ceiling and configured for coupling to and suspending the slider portion of the integrated magnetic slider assembly; and
        at least one hanging partition configured for coupling to the hanger portion of the integrated magnetic slider assembly, the at least one hanging partition having a plurality of pleats;
        wherein all the magnets in a plurality of integrated magnetic slider assemblies are vertically aligned with respect to each other to cause a magnetic attraction between adjacent magnets in order to hold the plurality of pleats together, when the at least one hanging partition is in a retracted position.

9. The aircraft of claim 8 wherein each of the plurality of pleats of the at least one hanging partition has a hemmed portion with an opening at an upper portion of the at least one hanging partition, each opening being in close proximity to the cabin ceiling of the cabin, and further wherein the hanger portion of the integrated magnetic slider assembly is positioned within each of two or more hemmed portions.

10. The aircraft of claim 8 wherein the at least one hanging partition partitions at least two cabin areas in the cabin of the aircraft.

11. The aircraft of claim 8 wherein when the at least one hanging partition is in the retracted position, the at least one hanging partition does not obstruct an emergency exit locator sign in proximity to the at least one hanging partition in the aircraft.

12. The aircraft of claim 8 wherein the slider portion and the hanger portion comprise either a monolithic configuration or a two-piece configuration.

13. A method of assembling a system for an integrated magnetic slider assembly, the method comprising the steps of:
    assembling a slider portion, a hanger portion coupled to or integrated with the slider portion, and one or more magnets coupled to the hanger portion, to form the integrated magnetic slider assembly, wherein the hanger portion has a head portion, a neck portion, first and second shoulder portions coupled to the neck portion, first and second lateral end portions coupled to the respective first and second shoulder portions, and a body portion with an opening through the body portion, and further wherein the one or more magnets is inserted into the opening of the hanger portion;
    coupling and suspending the slider portion of the integrated magnetic slider assembly to a longitudinal hanging device;
    coupling the hanger portion of the integrated magnetic slider assembly to at least one hanging partition having a plurality of pleats; and vertically aligning all the magnets in each integrated magnetic slider assembly with respect to each other to cause a magnetic attraction between adjacent magnets in order to hold the plurality of pleats together, when the at least one hanging partition is in a retracted position.

14. The method of claim 13 wherein the assembling step comprises coupling an attachment element comprising a snap fastener to the opening through the body portion of the hanger portion.

15. The method of claim 13 wherein the assembling step comprises coupling two magnets into the opening through the body portion of the hanger portion.

16. The method of claim 13 wherein the step of coupling the hanger portion of the integrated magnetic slider assembly to the at least one hanging partition comprises forming in each of the plurality of pleats a hemmed portion with an opening at an upper portion of the at least one hanging partition, and positioning the hanger portion of the integrated magnetic slider assembly within each of two or more hemmed portions.

17. The method of claim 13 wherein the step of vertically aligning all the magnets in the integrated magnetic slider assembly further comprises laterally stacking the magnets within and across an upper portion of the at least one hanging partition, when the at least one hanging partition is in the retracted position.

18. The method of claim 13 wherein the step of coupling the hanger portion of the integrated magnetic slider assembly to the at least one hanging partition comprises partitioning with the at least one hanging partition at least two cabin areas in a cabin of an aircraft.

19. The method of claim 13 wherein the step of coupling the hanger portion of the integrated magnetic slider assembly to the at least one hanging partition comprises when the at least one hanging partition is in the retracted position, the at least one hanging partition does not obstruct an emergency exit locator sign in proximity to the at least one hanging partition in the aircraft.

20. The method of claim 13 wherein the assembling step comprises assembling the slider portion and the hanger portion in either a monolithic configuration or a two-piece configuration.

* * * * *